United States Patent [19]

Weiss

[11] Patent Number: 5,742,743

[45] Date of Patent: Apr. 21, 1998

[54] APPARATUS AND METHOD FOR GENERATING A SCREEN REPRODUCTION OF A COLOR IMAGE INCLUDING DOT SHAPE ROTATION

[75] Inventor: Alex Weiss, Netanya, Israel

[73] Assignee: Scitex Corporation Ltd., Herzlia, Israel

[21] Appl. No.: 702,221

[22] Filed: Aug. 23, 1996

Related U.S. Application Data

[63] Continuation-in-part of Ser. No. 221,938, Apr. 1, 1994.

[51] Int. Cl.⁶ .......................... G06K 15/02; H04N 1/405
[52] U.S. Cl. .......................... 395/109; 358/536; 358/459
[58] Field of Search ..................... 395/109; 358/536, 358/534, 459, 456, 298

[56] References Cited

U.S. PATENT DOCUMENTS

| | | |
|---|---|---|
| 3,806,641 | 4/1974 | Crooks. |
| 4,040,094 | 8/1977 | Everett et al.. |
| 4,149,183 | 4/1979 | Pellar et al. ..................... 358/534 |
| 4,185,304 | 1/1980 | Holladay. |
| 4,196,451 | 4/1980 | Pellar ..................... 358/459 |
| 4,447,831 | 5/1984 | Adsett ..................... 358/459 |
| 4,456,924 | 6/1984 | Rosenfeld. |
| 4,595,956 | 6/1986 | Kawamura et al.. |
| 4,806,946 | 2/1989 | Ohnishi. |
| 4,825,298 | 4/1989 | Ikuta et al.. |
| 4,916,545 | 4/1990 | Granger. |
| 4,985,779 | 1/1991 | Gall. |
| 5,055,923 | 10/1991 | Kitagawa et al. ..................... 358/534 |
| 5,109,283 | 4/1992 | Carley ..................... 358/298 |
| 5,233,441 | 8/1993 | Hamilton. |

FOREIGN PATENT DOCUMENTS

| | | |
|---|---|---|
| 0 292 732 | 4/1988 | European Pat. Off.. |
| 2 098 022 | 3/1982 | United Kingdom. |
| 2 157 119 | 3/1985 | United Kingdom. |
| 91/16783 | 4/1991 | WIPO. |
| 91/16784 | 4/1991 | WIPO. |

*Primary Examiner*—Scott A. Rogers
*Attorney, Agent, or Firm*—Ladas & Parry

[57] ABSTRACT

Apparatus and method for screening an image for half-tone reproduction by image reproduction apparatus which includes a marking device, preferably a laser beam, which is operative to mark a medium along a multiplicity of parallel marking lines. The method includes the steps of providing a digital representation of density values of an original image, determining whether to rotate dot shape information in accordance with the dot shape symmetry and density, rotating dot shape information if the symmetry and density criteria are met, storing said dot shape information in its rotated on nonrotated form, said dot shape information representative of a screen function; and extracting said dot shape information from storage for said density values in the form of information that designates on and off points for each marking line. The apparatus includes means for carrying the steps of the disclosed method.

14 Claims, 30 Drawing Sheets

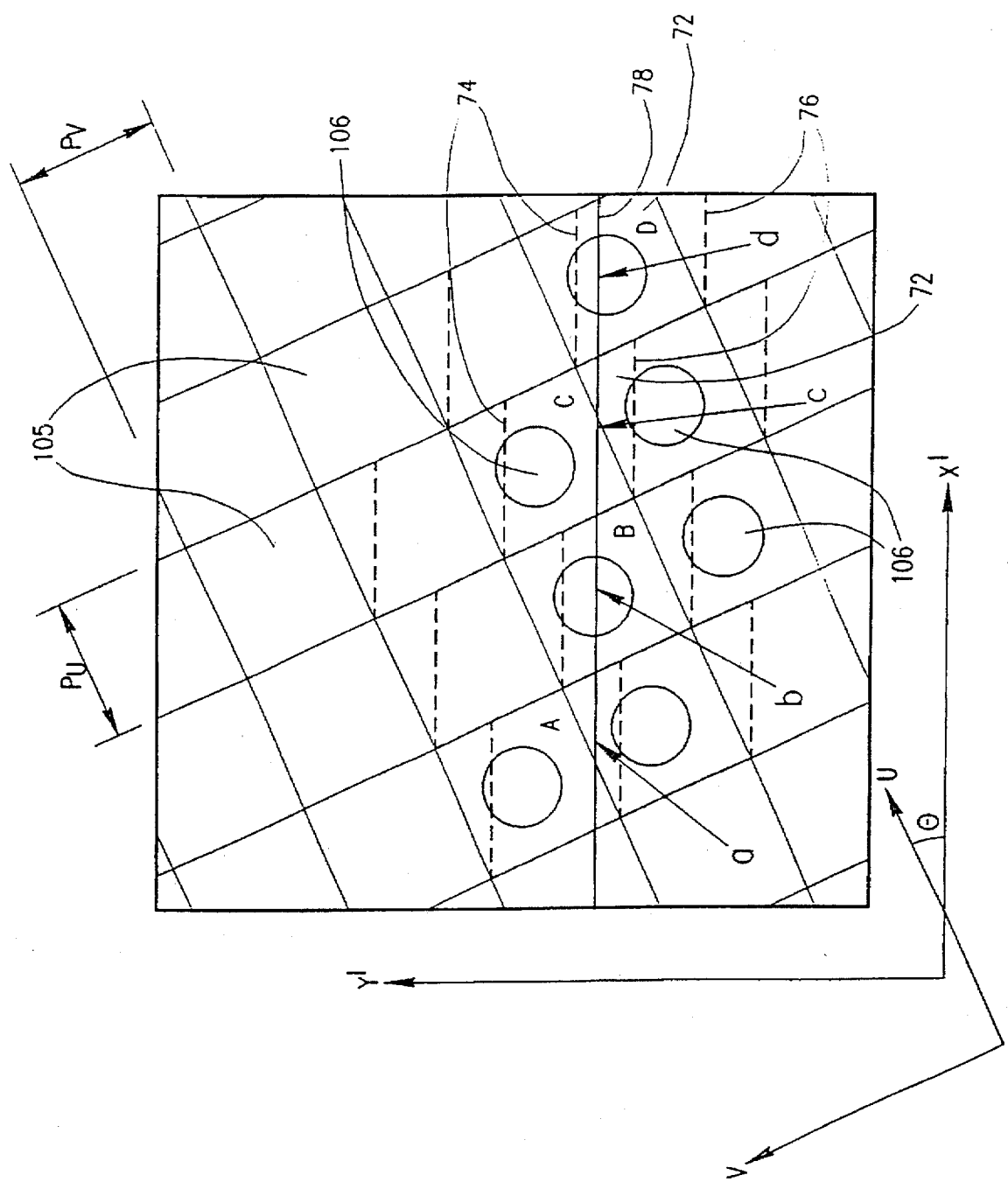

| INPUT DENSITY VALUE | SCREEN DOT SHAPE | EDGE POINTS IN CELL | LUT CONTENT |
|---|---|---|---|
| 20% | 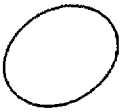 | 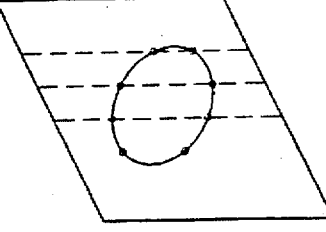 | 58,75<br>37,76<br>25,68 |
| 50% | 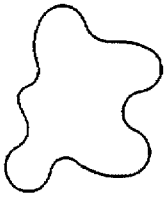 | 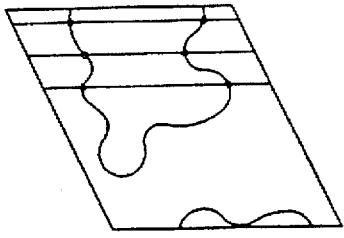 | 26,84<br>25,69<br>17,83 |
| 78% | 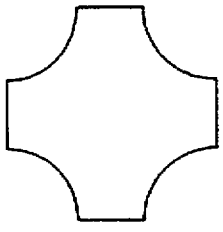 | 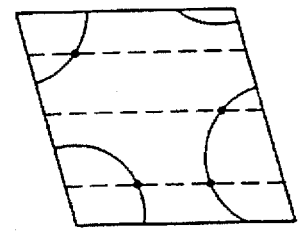 | 21<br>81<br>33,66 |
FIG.10

| COMPARISON RESULTS | POLARITY 0 | 1 |
|---|---|---|
| COUNT < X1 | 0 | 1 |
| X1 < COUNT < X2 | 1 | 0 |
| X2 < COUNT < X3 | 0 | 1 |
| X3 < COUNT < X4 | 1 | 0 |
| X4 < COUNT | 0 | 1 |

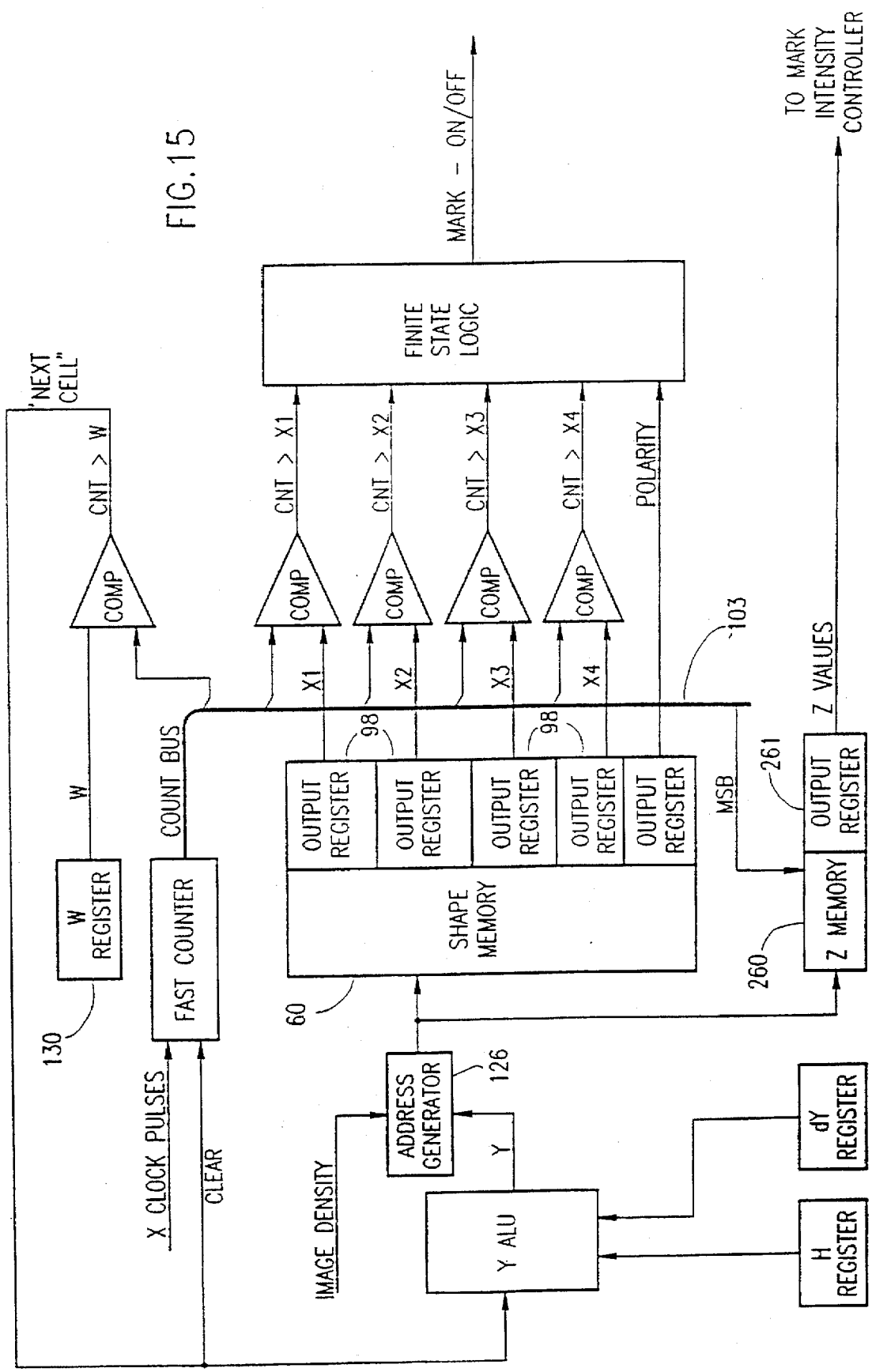

APPARATUS AND METHOD FOR GENERATING A SCREEN REPRODUCTION OF A COLOR IMAGE INCLUDING DOT SHAPE ROTATION

CROSS REFERENCE TO RELATED APPLICATIONS

This application is a continuation-in-part application of U.S. patent application Ser. No. 08/221,938 filed Apr. 1, 1994.

FIELD OF THE INVENTION

The present invention relates to screened image reproduction and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded with threshold values, defining a cell memory matrix. Input digitized scanned density values of an image, such as a color separation, are compared with the threshold values, pixel by pixel. The results provide an on/off control input for a laser plotter.

There are known threshold value based screening techniques which provide only screen angles having rational tangents. These techniques have the disadvantage of very large storage requirements for high-quality color screens.

The above-described methods have the further disadvantage of limiting the screen function to such as can be described by single valued functions.

U.S. Pat. No. 4,825,298 to Ikuta and Murai describes a technique for generating a screened reproduction of an image in which the density distribution of a given screen dot is expressed in three dimensions, wherein the area of the screen dot is expressed along X and Y axes and the density is expressed along a Z axis perpendicular thereto.

A film coordinate generator generates film coordinates (u,v), corresponding to the position of an exposure beam on a recording film, which position is detected by encoders. The film coordinates are, in turn, supplied to a screen coordinate generator to be converted into virtual screen coordinates (x,y). A beam control signal generator receives the coordinates and an image density signal corresponding to the position of the exposure beam, to output a signal controlling the exposure beam.

Operation of the signal generator is such that one coordinate value, for example x, is applied together with the image density value to a store containing corresponding upper and lower values of the other coordinate y, satisfying the screen dot function. When the received y coordinate, corresponding to the beam position, is between those tow limit values, the output signal indicates activation of the beam.

The technique of U.S. Pat. No. 4,825,298 has the advantage over the aforementioned threshold-based methods of allowing non-monotonic screen functions, but in common with them it still has the disadvantage that for each plotted dot (or recording pixel), its film-related coordinates must be translated into screen-related coordinates and the latter applied to the signal generator to obtain the beam-control signal, resulting in a large number of computations. This number, furthermore increases as the square of the increase in plotting resolution.

Matrix based methods have the further disadvantages of limited number of achievable tone values when the screen frequency (mesh) becomes high and of non-uniformities and artifacts in the shape of the individual screen dots, unless the recording resolution is very high, which, as mentioned, results in extremely large amount of computation. These disadvantages are partially circumvented by the use of multi-level exposure, as in U.S. Pat. No. 4,985,779.

U.K. Published Patent Application 2,157,119 A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

SUMMARY OF THE INVENTION

In accordance with an aspect of the present invention, there is provided a method and apparatus for carrying the steps of the method, for screening an image for half-tone reproduction by image reproduction apparatus comprising a marking device, preferably a laser beam, which is operative to mark a medium along a multiplicity of parallel marking lines.

In accordance with an aspect of the present invention, the method includes the steps of providing a digital representation of density values of an original image, determining whether to rotate dot shape information in accordance with the dot shape symmetry and density, rotating dot shape information if the symmetry and density criteria are met, storing the dot shape information in its rotated on nonrotated form, the dot shape information representative of a screen function and extracting the dot shape information from storage for the density values in the form of information that designates on and off points for each marking line.

In accordance with a preferred embodiment of the present invention, the step of storing dot shape information comprising storing the dot shape information in a line-by-line arrangement in accordance with the parallel marking lines. Further, the step of storing also comprises storing the dot shape information representative of a screen function in an input density-by-input density arrangement.

In accordance with a preferred embodiment of the present invention, the symmetry criteria is whether the dot shape is symmetrical or asymmetrical. If the dot shape is asymmetrical it is being rotated. Further, the symmetry criteria include ranges of dot densities which determine whether to rotate the dot shape information and to what extent. In a further preferred embodiment of the present invention, the maximal rotation is such that the longitudinal axis of the dot is generally perpendicular to the parallel marking lines and the maximal rotation angle is defined by the difference between 90 degrees and the screen angle.

DETAILED DESCRIPTION OF THE DRAWINGS

The present invention will be more fully understood and appreciated from the following detailed description, taken in conjunction with the drawings in which:

FIGS. 8A and 8B are illustrations of the geometric relationship between a marking line and the screen cell geometry according to which the dot shape information is stored;

FIG. 10 is an illustration of the derivation of part of the contents of a look up table used in the apparatus of FIG. 7, for an arbitrary dot configuration;

FIG. 15 is a simplified block diagram illustration of another preferred embodiment of screen processor providing variable mark intensity for enhanced interline resolution;

DETAILED DESCRIPTION OF A PREFERRED EMBODIMENT

Figure 1:
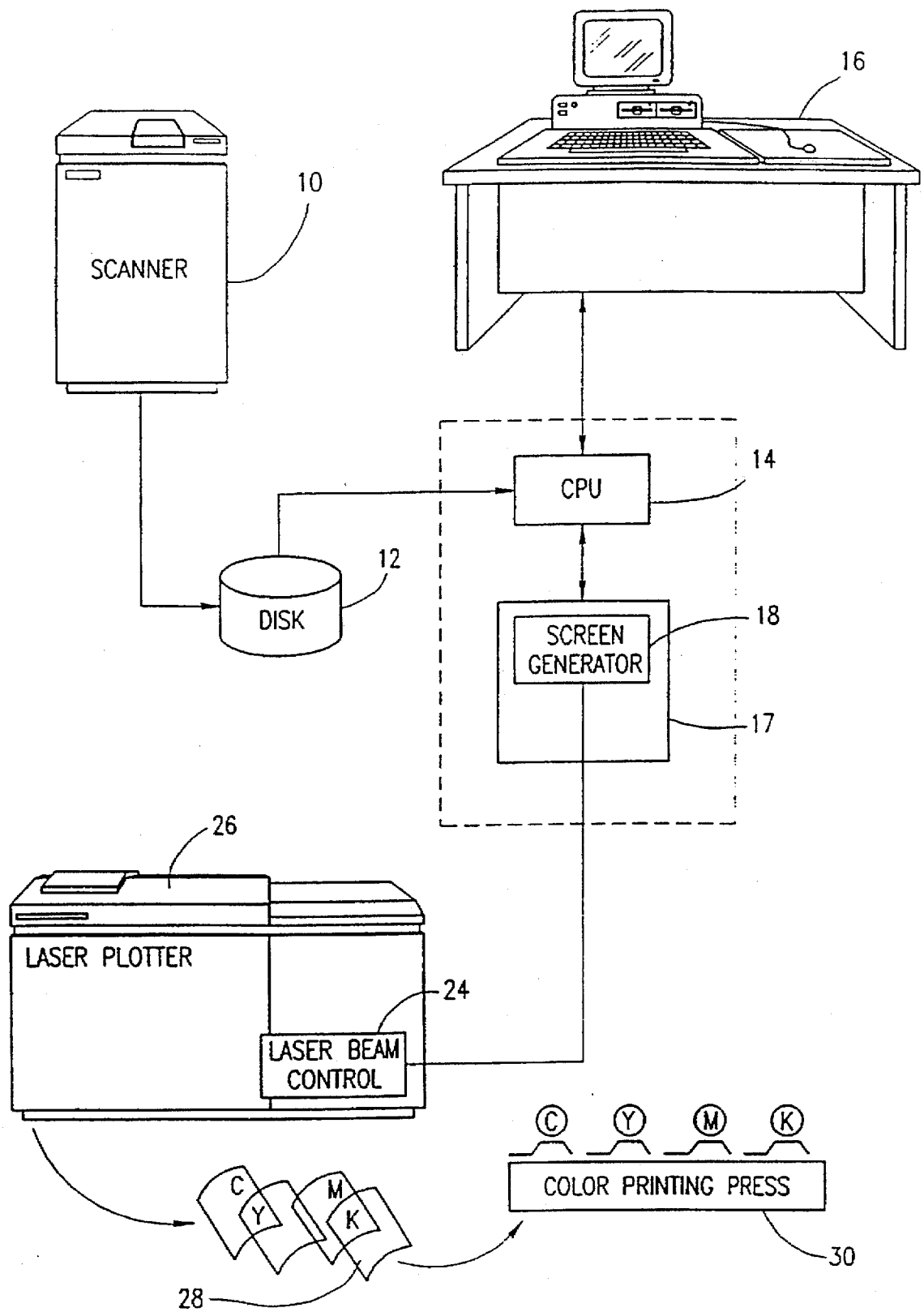
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and old by Scitex Corporation Ltd. of Herzlia, Israel, which is adapted to provide a digital color separation output of a color original.

The digital output of scanner 10 is normally stored on an image data disk 12 or any other suitable storage medium, which is accessible by a CPU 14, such as an Intel 80386. Interfacing with the CPU is an interactive workstation 16, such as a Scitex Prisma, manufactured and sold by Scitex Corporation Ltd. of Herzelia, Israel.

CPU 14 interfaces with a screen processor 17 including a screen generator 18. Screen generator 18 provides a control output to laser beam control circuitry 24 in a laser plotter 26, such as a dolev, manufactured and sold by Scitex Corporation Ltd. of Herzelia, Israel.

Laser plotter 26 produces halftone film color separations 28 which are employed in a conventional process color printing press 30, to produce process color prints.

Screen generator 18 is illustrated in greater detail in FIG. 7 and will be described hereinbelow.

Figure 2:
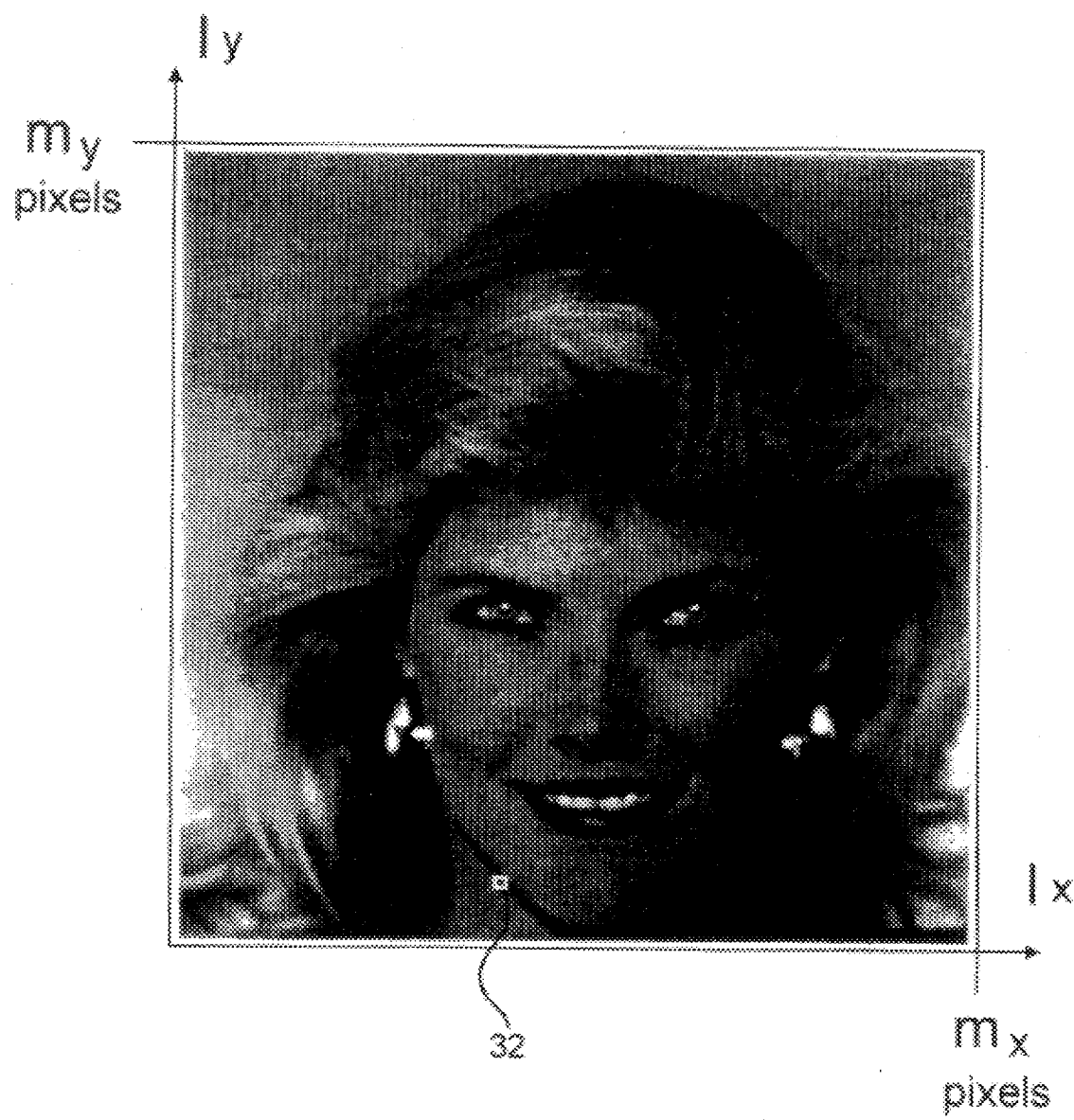
FIG. 2 is an illustration of a typical color separation.
Figure 3:
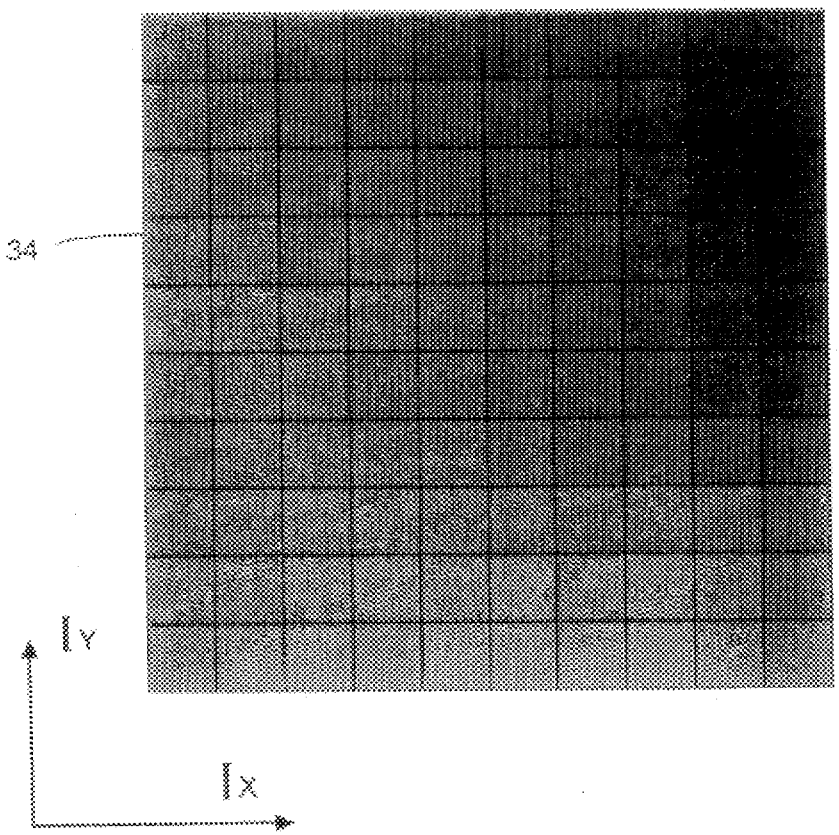
FIG. 3 is an enlarged illustration of a small portion of the color separation of FIG. 2.

Reference is now made to FIGS. 2 and 3. FIG. 2 illustrates a typical halftone color separation which is stored on disk 12. FIG. 3 illustrates in enlarged detail, a small area 32 indicated on FIG. 2. It is notes that the gray level over area 32 varies thereacross.

The halftone color separation in general and the small area 32 in particular are hereinafter termed the input image and are divided into a first multiplicity of pixels 34 which are arranged along input image coordinate axes $X_1$ and $Y_1$. Pixels 34 typically define a resolution of 100–400 pixels per inch along each of the coordinate axes of the input image.

Figure 4:
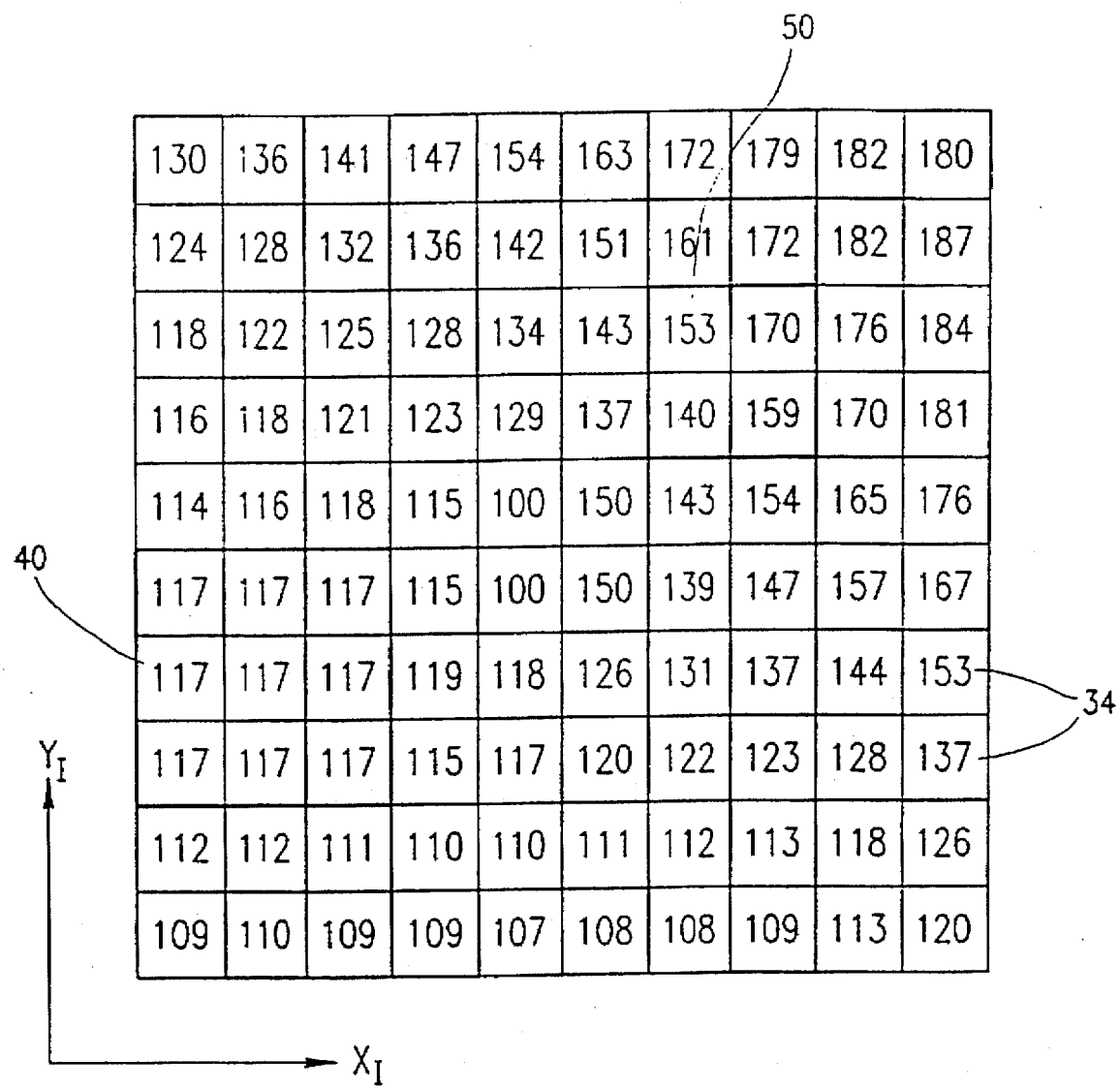
FIG. 4 is an illustration of pixel-by-pixel input density values for the small portion of the color separation as shown in FIG. 3.

A representative gray level value, such as an average gray level, for each pixel 34 is represented digitally by an input density level. There are typically provided 256 different input density levels, 0 being the lightest and 255 being the blackest. FIG. 4 illustrates the input density values for the pixels 34 of FIG. 3.

The present invention relates to the generation of a screen for process color printing. The screen is conventionally formed of a regular two-dimensional rectilinear grid of cells, each cell containing one or more screen dots whose size and configuration represent the input density levels of the corresponding pixels.

For any one screen configuration, the rows of the grid may form a given angle with the horizontal or vertical, termed the "screen angle". For process color printing, generally there is a different screen angle for each printing color, usually three of these angles mutually differing by 30 degrees.

Figure 5A:
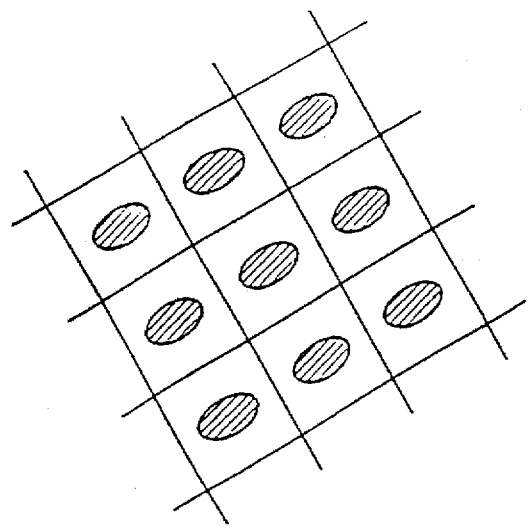
FIGS. 5A, 5B and 5C are illustrations of part of a screen for three different uniform input densities which is constructed and operative in accordance with a preferred embodiment of the present invention.
Figure 5B:
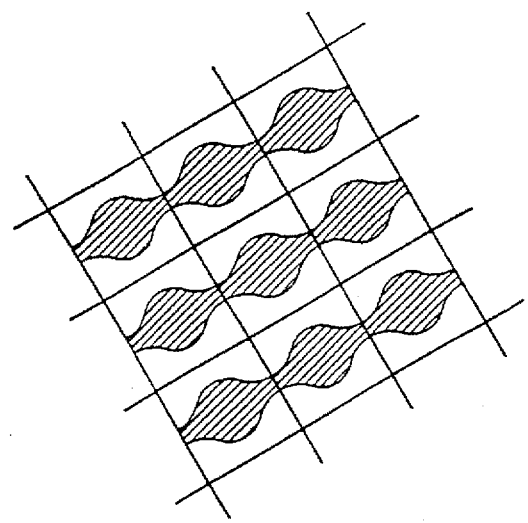
Figure 5C:
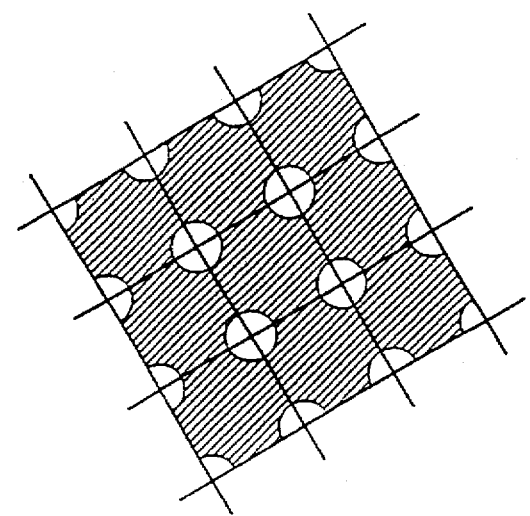

FIGS. 5A, 5B and 5C illustrate three examples of dot configurations of a screen configured in a particular angle, each corresponding to a different uniform input density level.

It is a particular feature of the present invention that the screen dot configurations are stored explicitly for each of a multiplicity of different input density values. It is another particular feature of the present invention that such storage is for a screen configuration of a given angle and that the stored dot configurations are in terms of a frame of reference forming a zero-degree angle with that of the out image.

The face that screen dot configurations can be stored for each of the 256 possible different input density values enables any desired dot configurations to be produced, without there being any constraint on the relationship of dot configurations and sizes between different input density levels.

Figure 6:
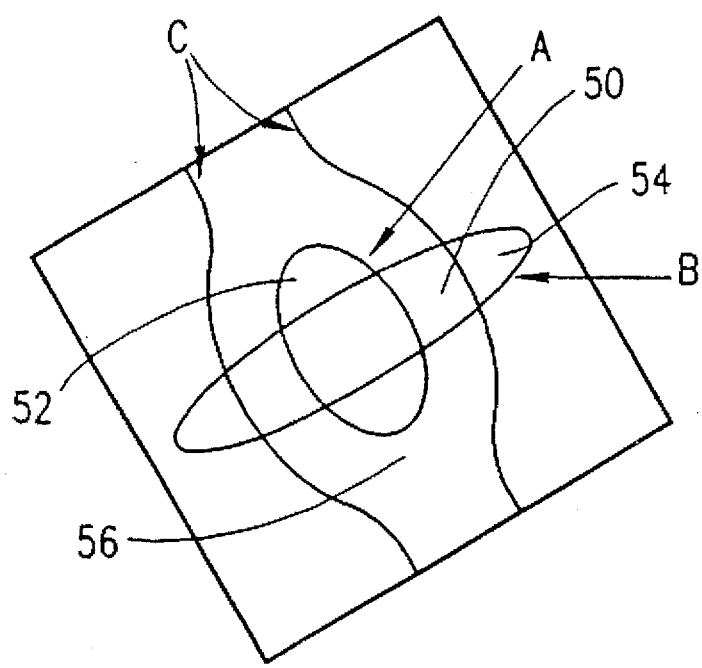
FIG. 6 is an illustration of superimposed outlines of three arbitrary configurations of a single dot at different uniform input density levels for a screen constructed and operative in accordance with a preferred embodiment of the present invention.

FIG. 6 illustrates superimposed outlines of three arbitrary configurations of a single dot at different uniform input density levels for a screen constructed and operative in accordance with a preferred embodiment of the present invention. It can be seen that the dots, whose outlines are indicated by letters A and B have mutually exclusive areas, indicated by reference numeral 50 and 52. Likewise, the dots, whose outlines are indicated by letters B and C have mutually exclusive ares indicated by reference numeral 54 and 56. The presence of the mutually exclusive areas, such as those indicated by reference numeral 54 and 56, indicates that the growth in dot area as a function of increasing input density need not be monotonic in any given area of the cell.

Reference is now made to FIG. 7, which illustrates a preferred embodiment of screen generator 18 of FIG. 1. A shape memory 60 contains dot shape information corresponding to a particular screen configuration for all 256 input density levels. The contents of memory 60 may be understood from a consideration of FIGS. 8A, 8B, 9 and 10, to which reference is now made.

Figure 9:
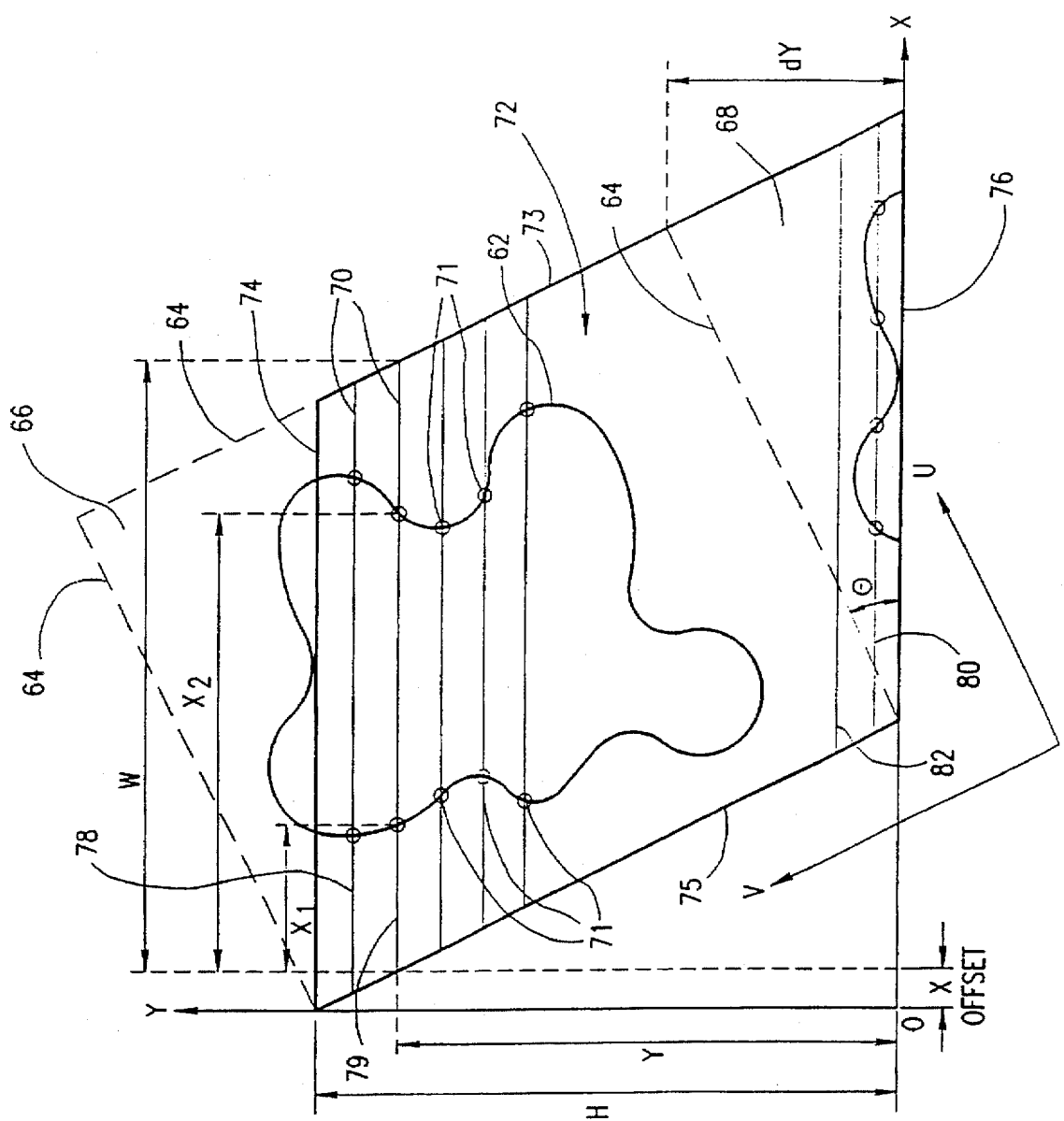
FIG. 9 is a simplified illustration of the geometry underlying the derivation of LUT contents for a typical screen dot.

FIG. 9 shows the contour 62 of a typical screen dot which is located within the boundaries (indicated by dashed lines 64) of a repeated screen cell 66. The screen cell 66 is inclined by a given screening angle theta with respect to an X', Y' coordinate system in which the laser beam of a laser plotter 26 (FIG. 1) moves parallel to the X' direction . Theta can be any angle. It is notes that below cell 66 there is shown part of an identical cell, here indicated by reference numeral 68, containing a screen dot contour, part of which is seen, which is identical to dot contour 62.

A plurality of lines 70 extending parallel to the X' axis represent possible paths of a laser beam of laser plotter 26. The intersections 71 of lines 70 with contour 62 represent the ON-OFF switching locations of the laser beam. The coordinates of these intersections are stored in shape memory 60 of the screen generator 18.

It is a particular feature of the present invention that the coordinate system (X,Y) which is employed in addressing the shape memory 60 is parallel to the coordinate system (X', Y') of the plotter.

It is also a particular feature of the invention that memory 60 stores only the abscissas of each of the intersections 71 for each of lines 70 and that the memory addresses are determined by image density values and the ordinate values in the (X,Y) coordinate system.

An elementary cell area 72 which is most convenient for compact storage of information is characterized by the shape of a parallelogram bounded by respective horizontal top and bottom boundaries 74 and 76, extending parallel to the X' axis, which are separated by a height H in a direction parallel to the Y' axis. The side boundaries 73 and 75 of cells 72 are collinear with the side walls of cells 66 and 68. The width of the cell area 72 parallel to the abscissa is W. Boundaries 74 and 76 are also indicated by identical reference numerals in FIG. 8A. It is noted that the information contained in area 72 is identical to that contained in the cell 66, but is arranged differently.

FIG. 8A illustrates the orientation of elementary cell area 72 in a portion of a screen and shows a given marking line 78 extending through a plurality of such cell areas.

The abscissa values for each line 70, indicated for a typical line 79 as $X_1$, $X_2$..., are stored in memory 60. As seen particularly in FIG. 9, each abscissa value is preferably measured along a line 70 from the left side boundary 75 of cell 72 to the respective shape intersection point 71. It is noted that the number of intersection points, and thus stored abscissa values, along any line 70 may vary between 0 and a predetermined maximum, such as six.

Figure 11:
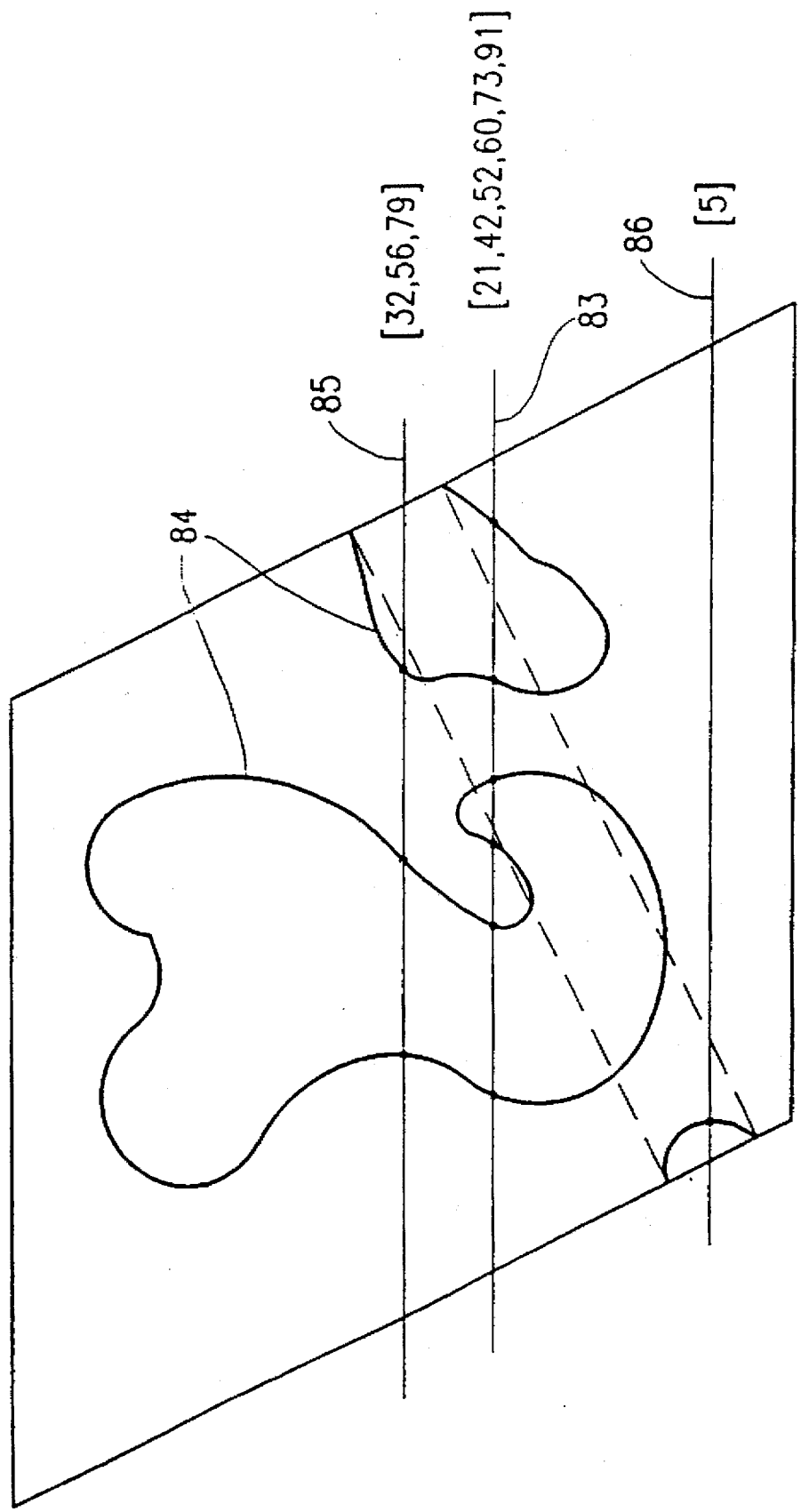
FIG. 11 is an illustration of a relatively complicated dot configuration and the derivation of LUT contents representing it.

Thus, for example, in the example shown in FIG. 9, the top two lines 78 and 79 are seen to have two abscissa values and line 82 has no abscissa value. FIG. 11, shows a relatively complex dot configuration wherein a line 83 has six abscissa values indicating intersections with a contour 84, a line 85 has three abscissa values and a line 86 has a single abscissa value.

Reference is now made to FIG. 10, which illustrates how abscissa values to be stored in memory 60, typically implemented in a LUT, are derived for three different dot shapes, corresponding to three different image density values. It is seen that the LUT contents are abscissa values. The abscissa values may be stored at any desired level of precision, consistent with the resolution of the apparatus employed.

The scale of the stored abscissa values may be any suitable scale. Two types of scales are believed to has certain advantages. One such scale is that at which screen generation takes place. The use of such a scale thus simplifies screen generation and is assumed in the remainder of this description. Any other scale which can be readily concerted to the scale at which screen generation takes place, e.g. by simple constant multiplication of division, may also be employed. It is noted that either type of scaling, in combination with the Y addressing discussed below, is equivalent to setting the screen pitch with respect to the recorded medium.

Memory 60 may also store, in addition to the abscissa values for each line, information, herein referred to as "polarity information" which indicates whether the initial portion of the line represents a marking or non-marking state of the laser plotter. Usually, the polarity information is carried by a single bit.

The ordinates Y of the lines 70 within the cell area 72 for which abscissa values are stored in memory 60 may be arbitrarily selected. Preferably, Y values which are equally spaced along the height H are selected. It is appreciated that the greater the number of stored lines, the greater is the accuracy with which a dot shape can be produced. In practice more than 100 lines 70 may be included within a cell area 72.

It is noted that memory 60 may usefully store information for more than a single cell area 72, notwithstanding that this information is redundant. This excess storage may be particularly helpful in certain information extraction techniques.

It is appreciated that for any image density value, the information stored in memory 60 provides for close approximation of the ideal shape of each dot in a screen for that image density value, with the desired rotation by theta degrees as represented by dot contour 62. A set of screen having identical dot configurations but different rotation angles theta, as required, for example, for process color printing, is readily derived from the basic dot configuration by rotating the contours to the desired angle theta and then deriving the abscissa values to be stored in the manner described hereinabove.

Alternatively, the lines 70 may be rotated by an angle theta with respect to a non-rotated dot configuration and the abscissa values may be derived along such rotated lines in a similar manner.

Figure 12A:
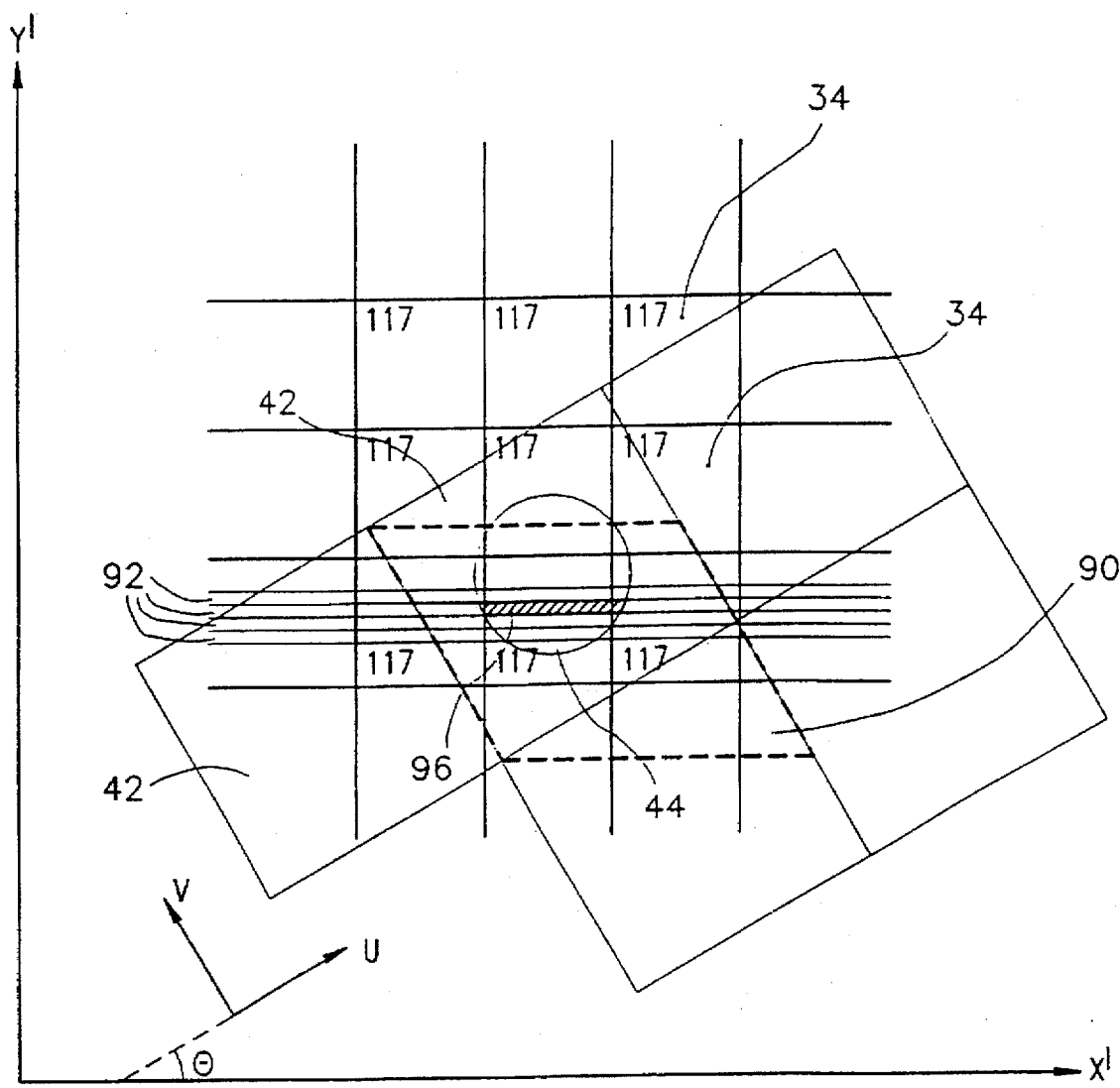
FIGS. 12A and 12B illustrate the construction of a dot using a laser plotter according to the present invention.

Reference is not made additionally to FIGS. 12A, 12B, 13A and 13B to best illustrate the structure and operation of the screen generator of FIG. 7. FIG. 12A illustrates multiple cells of a screen 42, which is oriented at an angle theta with respect to the X', Y' coordinate system. Screen 42 is superimposed on a grid of pixels 34 representing an input image, all of the pixels having the same input density value of 117. A typical screen dot representing that uniform input density appears as a circle 44.

A cell area, corresponding to cell area 72, i.e. the cell area for which information is stored in memory 60, is shown at reference numeral 90 as a parallelogram and is delineated by dashed lines. Lines 92, representing several adjacent scan lines of the laser plotter are superimposed over the screen 42. A segment of a given scan line lying within screen dot 44, and therefore representing a marking segment, is shaded and is indicated by reference numeral 96.

The vertical location Y' of a given scan line 92 in the coordinate system of the film is converted by the Y ALU 124 to a vertical location Y in the coordinate system of the cell area in memory. This vertical location Y and the input density value 117 are applied to address generator 126 which generates an address in a look up table of memory 60. This address points to a location in memory 60 containing shape information for the dot configuration corresponding to input density 117 and a line having an ordinate value nearest to Y. The appropriate output registers 98 read out form memory 60 to appropriate comparators 100 a pari of corresponding abscissa values, $X_1$ and $X_2$.

Comparators 100 receive a count output from and X-counter 102 along a count bus 103, the count output representing a current abscissa value, and compare the abscissa values $X_1$ and $X_2$ with the current abscissa value. Counter 102 is preferably fed by fast clock pulses that are synchronized with the motion of the laser beam of the laser plotter 26 (FIG. 1) and is reset approximately to zero at a time corresponding to each time that the laser beam crosses the left boundary of a cell area 90. Accordingly, the output of the counter always represents the abscissa of the beam location along the scan line relative to the current cell area 90.

Inasmuch as the abscissa values X1 and X2 are relative to the current cell are 90, the comparison carried out by comparators 100 thus indicates whether or not the beam is within the dot area 44. Based on this indication, a suitable ON/OFF signal is provided by finite state logic circuitry 104 to the laser beam control circuitry 24 of the laser plotter 26.

Figure 12B:
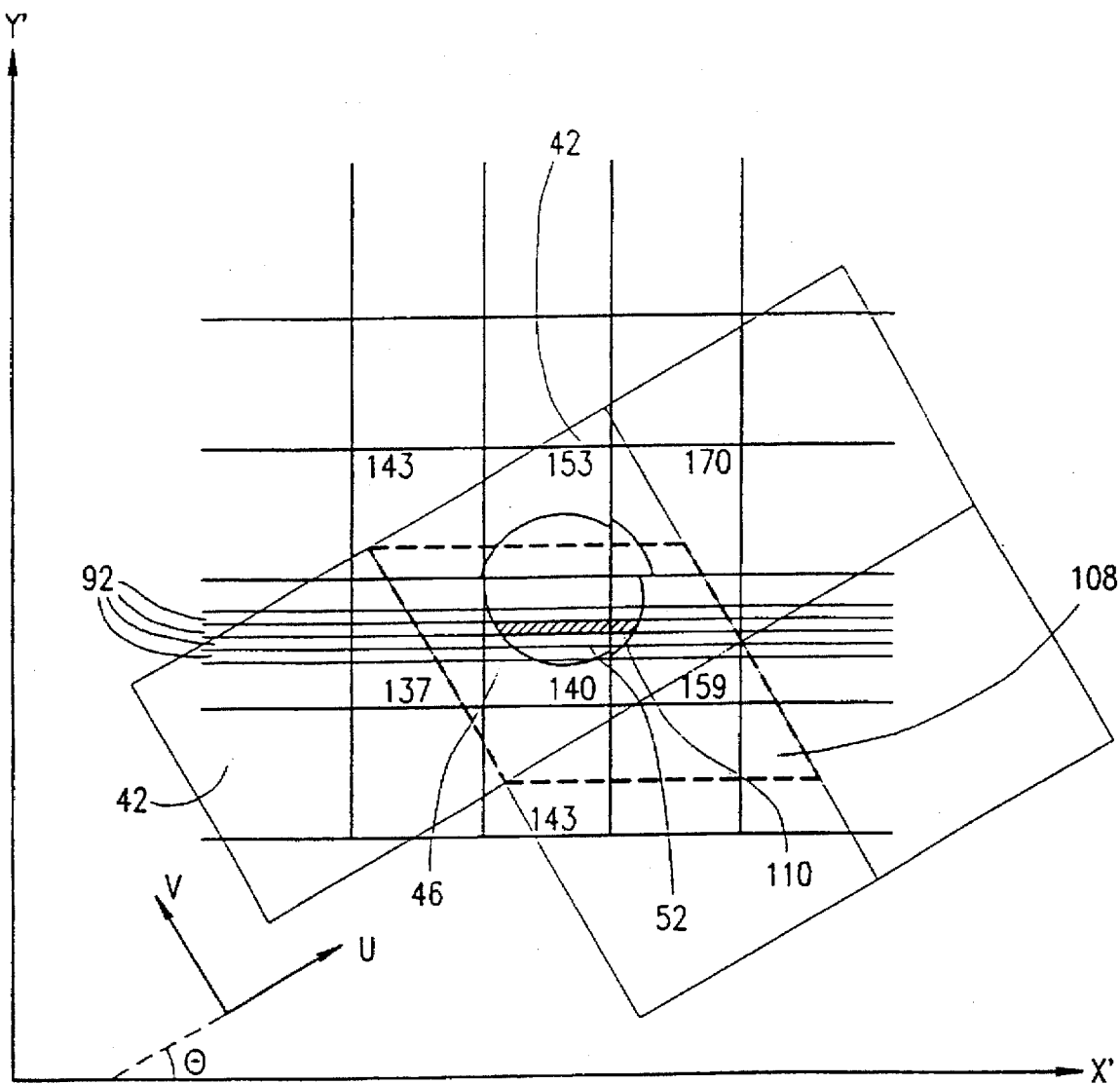

The illustration of FIG. 12B is similar to that of FIG. 12A, except that in FIG. 12B, the input density values are different for different pixels. In this case, the current cell area 108 covers pixels having several different density values. The scan line 110 within cell area 108 traverses pixels having three different input density values 137, 140 and 159. Accordingly, memory 60 is addressed three times, first at the left boundary of the current cell area 108 and subsequently at the left boundaries of the pixels indicated to have input density values 140 and 159. As a result, the abscissa values being read out from the memory 60 change form pixel to pixel. the value stored at any given time in the output register are compared with the output of counter 102 to determine the ON and OFF switching points for the laser beam.

Reference is now made to FIG. 8A which illustrates a somewhat larger portion of the screen than is shown in FIG. 12A and includes a plurality of screen cells 105 over which are mapped a plurality of cell areas 72 as represented in memory, each having the shape of a parallelogram defined by an upper boundary 74 and a lower boundary 76. Scan line 78 is seen to extend through several adjacent cells 72.

The screen is seen to be angled at an angle theta with respect to the X', Y' coordinate system and its pitch along its principal coordinates U and V is indicated as $P_u$ and $P_v$, respectively. screen dots, which in the illustrated example, are circular and correspond to uniform input densities, are indicated by reference numeral 106.

Figure 8B:
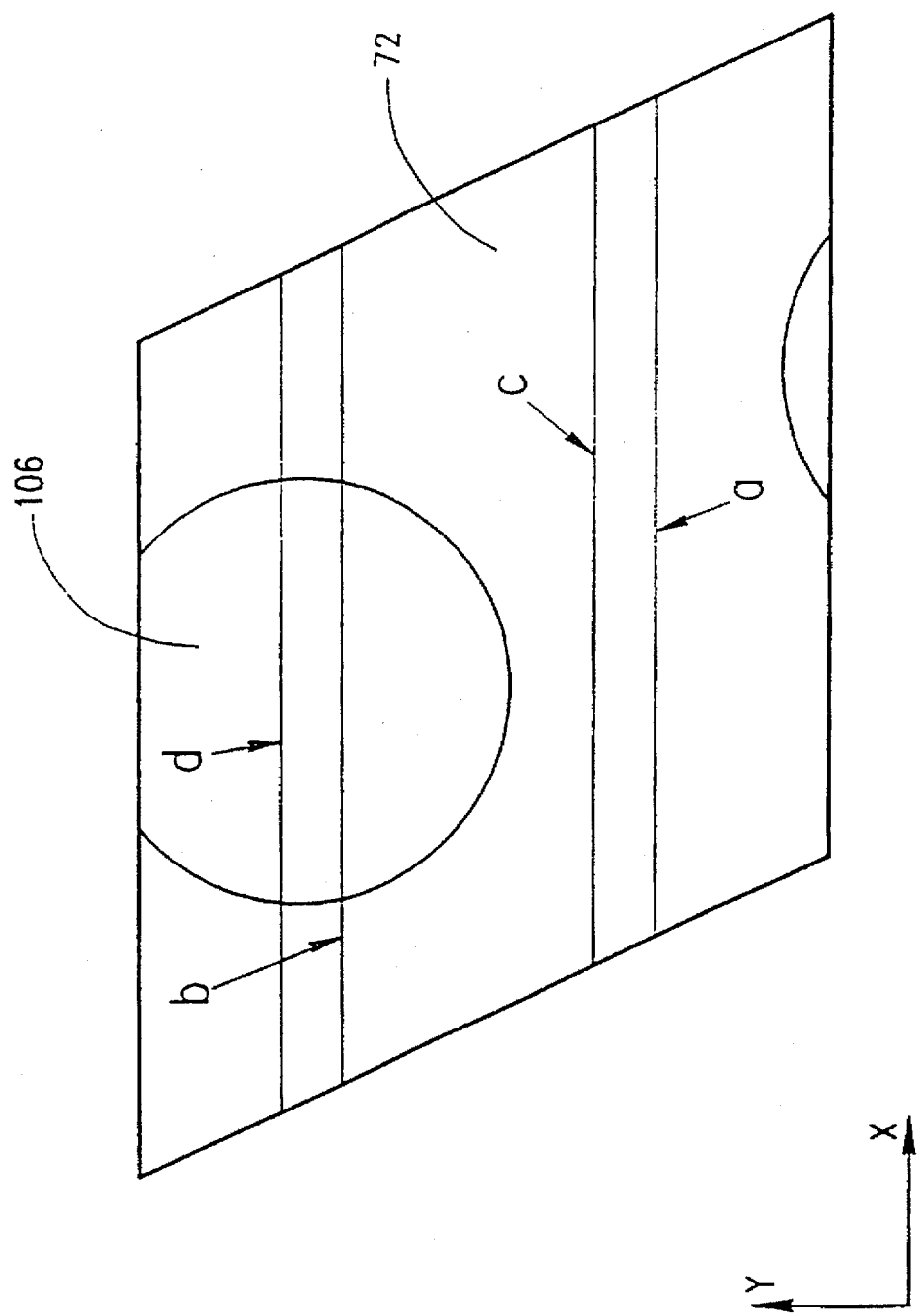

FIG. 8B illustrates a plurality of cell areas 72, indicated in FIG. 8A as A, B, C and D respectively, arranged in superimposed form. Each of the plurality of superimposed cell area 72 includes a segment of the intersecting scan line 78, respectively indicated in FIGS. 8A and 8B as a, b, c and d. It can be seen from FIG. 8B that, in general, the scan line 78 crosses the various cell areas 72 at different vertical locations therein.

It is noted that in a particular case where theta is equal to zero, all of the segments of the scan line 78 have the same Y value. where theta has a rational tangent, the various segments each have one of a finite number of Y values.

For each successive cell area 72 along the scan line 78 the ordinate is determined by subtracting from the ordinate of the preceding cell area the amount by which the adjacent cells are offset along the Y' axis and applying modulo H as necessary to place the scan line within the cell are 72. More precisely, the applicable formulas are as follows:

$$y(next)=[Y(preceding)-dY]mod(H)$$

where $$dY=P_u* sin(theta)$$

and $$H=P_v* cos(theta)$$

It is appreciated that for a given screen angle theta and given screen pitches $P_{u\ l\ and\ Pv}$, dY and H are constant. The constants, dY and H are stored in respective registers 120 and 122 in the screen generator apparatus of FIG. 7. Y ALU 124, including an appropriate register, employs the stored constants dY and H and the above formula for Y(next) to calculate a Y value for each successive cell 72 along the scan line.

This Y value is supplied to address generator 126 which received an image density input from CPU 14 (FIG. 1) and generates an appropriate address to the LUT in shape memory 60. The address generator 126 operates as follows: It has stored in an internal LUT a list of n Y values, corresponding to the n lines 70 for which shape information is stored in the shape memory 60. From this list, the address generator selects a Y value nearest to the calculated Y value. It is here assumed that the stored Y values are in the scale of the calculated Y, which is equivalent to having the stored data pre-scaled to the screen being generated. An alternative way is to store the LUT in terms of normalized Y values and to multiply the calculated Y value by an appropriate scale factor prior to applying it to the LUT. The address generator then combines the corresponding internal LUT address with the input density value, to determine the corresponding address in the LUT of the shape memory 60.

The X counter 102, whose contents represent the laser plotter beam position within a given cell 72, is reset when the count in the X counter 102 reaches the value W, which indicates the time that the laser beam crosses the left boundary of each cell 72. W, which represents the constant width of each cell 72, may be expressed as follows:

$$W=P_u/cos (theta)$$

A comparator 128 received the output of X counter 102 and compares it with W, stored in a register 130. Each time the output of X counter 102 exceeds W, comparator 128 provides a reset signal which is supplied to X counter 102 as well as to Y ALU 124.

The operation of the apparatus of FIG. 7 in the context of the apparatus of FIG. 1 will now be more fully explained with reference to the flow chart of FIG. 13A and the logic diagram of FIG. 13B.

The laser plotter 26 is employed to write an output image which has a generally rectangular configuration and defines a left edge. The image is written by successive scan lines, such as scan lines 92 (FIG. 12A), whose centerline are spaced apart by a distance S. For the purposes of this discussion, the scan lines are assumed to extend horizontally and thus the separation S is measured vertically.

The stored image to be screened is received by the screen generator 18 (FIG. 1) from CPU 14 (FIG. 1) as a stream of pixelwise image density values, which are fed to address generator 126 (FIG. 7). It is assumed that the stream of image density values is synchronized with the scan rate of the laser plotter 26 (FIG. 1), that a start of scan line signal is available to indicate location of the laser plotter beam at the left edge of the image and that the start of plot signal is provided to indicate the beginning of the first scan line. A fast stream of clock pulses is also provided in synchronism with the operation of the laser plotter, for driving X counter 102 (FIG. 7).

It is a particular feature of the present invention that the time separation between successive clock pulse inputs to the X counter 102 is substantially less that the time required by the laser plotter beam to traverses a horizontal distance of magnitude equal to the magnitude of the vertical separation S. The resulting horizontal resolution is thus significantly finer than available in the prior art.

At the beginning of each plot, i.e. at the staring lower left hand corner of the image, two running parameters, X OFFSET and INITIAL Y are set to zero. Thereafter, these two parameters are recomputed at the beginning of each scan line. The computations involve incrementing the preceding values for the parameters according to the following algorithm:

X OFFSET (current)=X OFFSET (preceding)+S tan (theta)
If X OFFSET (current)>W then:
 X OFFSET (next)=X OFFSET (current)−W and
 INITIAL Y (next)=[INITIAL Y (preceding)+S−dY] mod (H)
Otherwise
 X OFFSET (next)=X OFFSET (current) and
 INITIAL Y (next)=[INITIAL Y (preceding)+S]mod (H)

At the beginning of each scan line, the X OFFSET value thus computed is set into the X counter 102 (FIG. 7), causing the X counter 102 to start with the correct beam position within the first cell 72 traversed by the scan line. Similarly the INITIAL Y value is taken as the Y value for that first cell 72 and is retained in the Y ALU and Register 124.

Thereafter, the X counter 102 and the Y Register 124 are updated along the scan line at every cell boundary intersected by the scan line in the following manner:

The contents of the X counter 102 appearing on count bus 103 are continuously compared by comparator 128 with the constant cell width value W, stored in register 130. When the count on count bus 103 exceeds the value W, comparator 128 outputs a NEXT CELL signal which is supplied to the X counter 102 as a reset and to the Y ALU and register 124 to cause a next Y value to be computed and retained, as described hereinabove. It will be understood that the value W may be stored at a higher precision than that available in the X counter and that the count at which the "next cell" signal is generated need equal W only on the average. Such equality is achievable by digital techniques well known in the art.

The address generator 126 receives the current value of Y from Y ALU and Register 124 and the current image density value from CPU 14 (FIG. 1). It will be understood that the image density values are received from the CPU 14 (FIG. 1) essentially in synchronism with the fast pulse train. In order to positively synchronize these input density values with the ensuing operations, which by themselves are assumed to run synchronously, that is—in order for the input density values to constitute properly timed pixels, they are gated into the address generator 126 through a gate 131 by a train of "pixel pulses". These pixel pulses are obtained from the fast pulse train via a divider 133.

In accordance with one preferred embodiment of the present invention, the address generator 126 is operative to approximate current Y by the nearest Y value for which shape information is stored in shape memory 60. The number of such Y values for which shape information is stored is preferably over 100 per cell.

The approximated Y value is logically combined, as described above, by the address generator 126 with the image density value received from CPU 14, to yield a memory address. This address is supplied to memory 60 to extract therefrom the corresponding shape information.

Figure 7A:
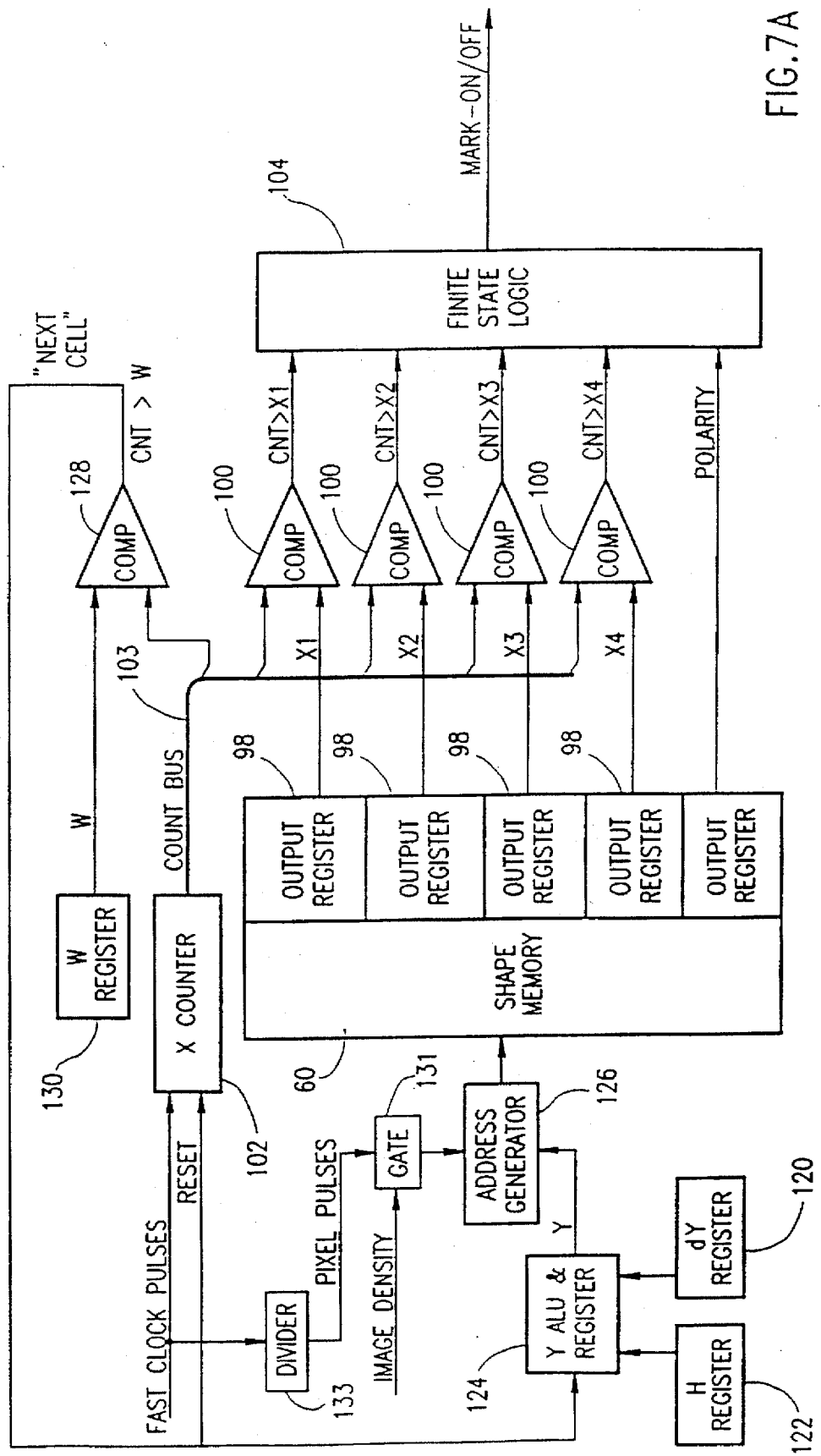
FIGS. 7A, 7B and 7C are simplified block diagram illustrations of three preferred embodiments of a screen generator employed in the apparatus of FIG. 1.
Figure 7B:
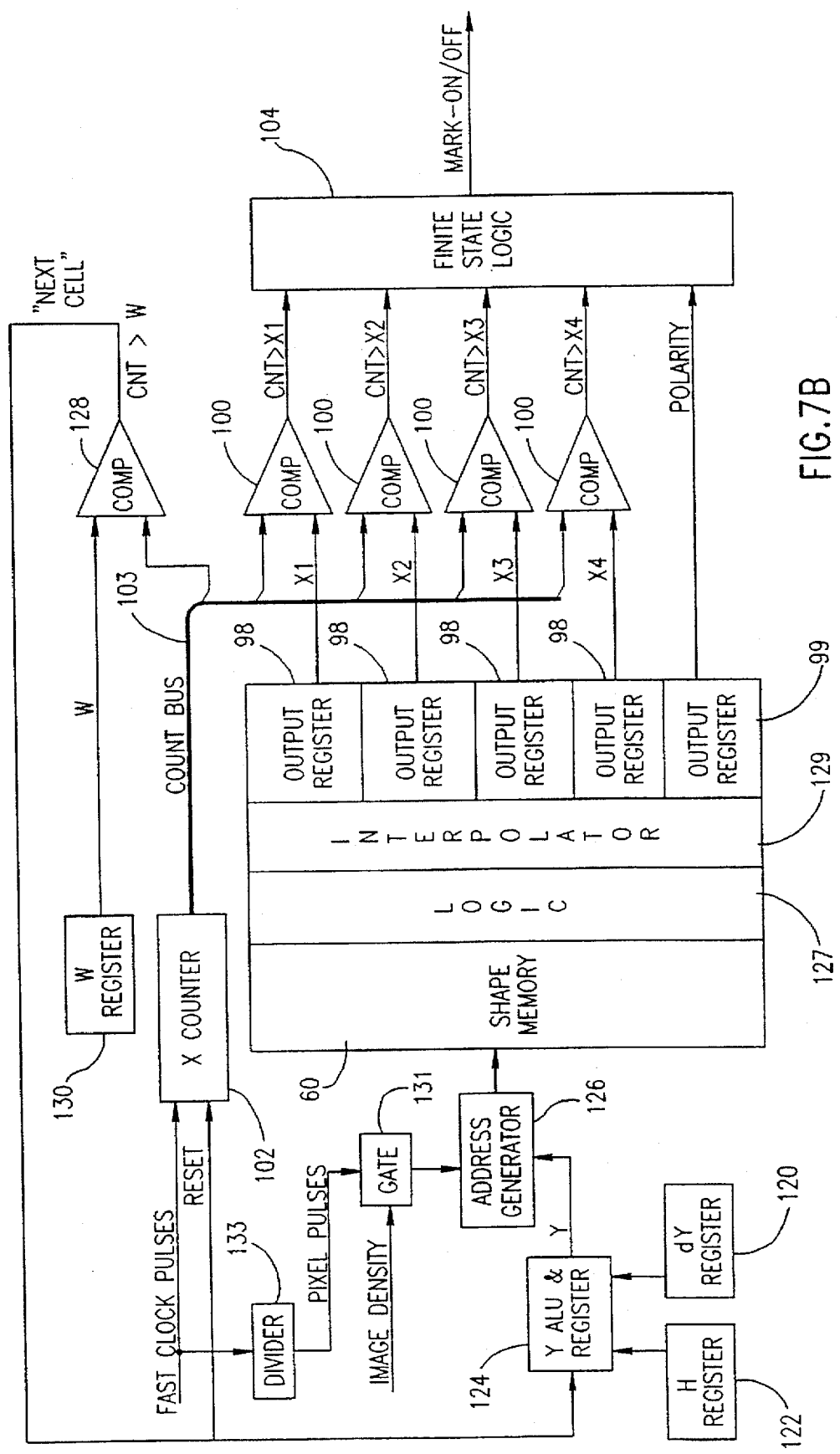

In accordance with a first alternative embodiment, illustrated in FIG. 7B, the address generator 126 is operative to approximate the current Y value, obtained from Y ALU 124, by the nearest value or values just greater than Y, and the nearest value or values just smaller than Y, for which shape information is stored in shape memory 60. The number of such Y values may be relatively small, preferably less than 100.

The nearest Y values thus obtained are logically combined, as described above, by the address generator 126 with the image density value received from CPU 14 to yield corresponding memory addresses. These addresses are supplied to memory 60 to extract therefrom the corresponding shape information.

The abscissa values thus extracted are grouped by a logic unit 127 into groups so that each group contains at most one abscissa value from each address and so that the differences between values within any group are in general smaller than differences between values belonging to different groups. Null values are disregarded. It is noted that the number of groups thus formed will be equal to the greatest number of abscissa values extracted from any one address.

An interpolator 129 interpolates between all the values within each group and places the results into output registers 98. The interpolation function is weighted by Y, i.e. it takes into account the differences between the current Y value and the selected nearest Y values. If within any group there are abscissa values that correspond to Y values that are only smaller than, or only greater than the current Y value, then the interpolation operation is replaced by extrapolation.

It is noted that the type of interpolation or extrapolation function applied is linked with the number of nearest Y values above or below current Y that are generated by the address generator 126. For example, the case of single nearest values above and below current Y is typically linked with linear interpolation.

In accordance with a second alternative embodiment, also illustrated in FIG. 7B, the number of density values for which shape information is stored in memory 60 is smaller than the total number of density values possible in the input signal received from CPU 14, which typically is 256. For a given input density value, the address generator 126 is operative to approximate it by the nearest density value or values just greater than the input density, and the nearest density value or values just smaller than the input density, for which shape information is stored in shape memory 60.

The nearest density values thus obtained are logically combined, as described above, by the address generator 126 with the Y value, received from Y ALU 124, to yield corresponding memory addresses. These addresses are supplied to memory 60 to extract therefrom the corresponding shape information.

The abscissa values thus extracted are grouped by logic unit 127 into groups and interpolated by interpolator 129 in the same manner as described hereinabove with respect to the first alternative embodiment, except that weighting is by density values. The resultant abscissa values are placed into output registers 98.

It will be appreciated by persons skilled in the art that the two alternative embodiments described hereinabove can in effect be combined, inasmuch as any interpolation operation becomes a two-dimensional interpolation, weighted by both the density values and the Y values.

Figures 13A, 13B:
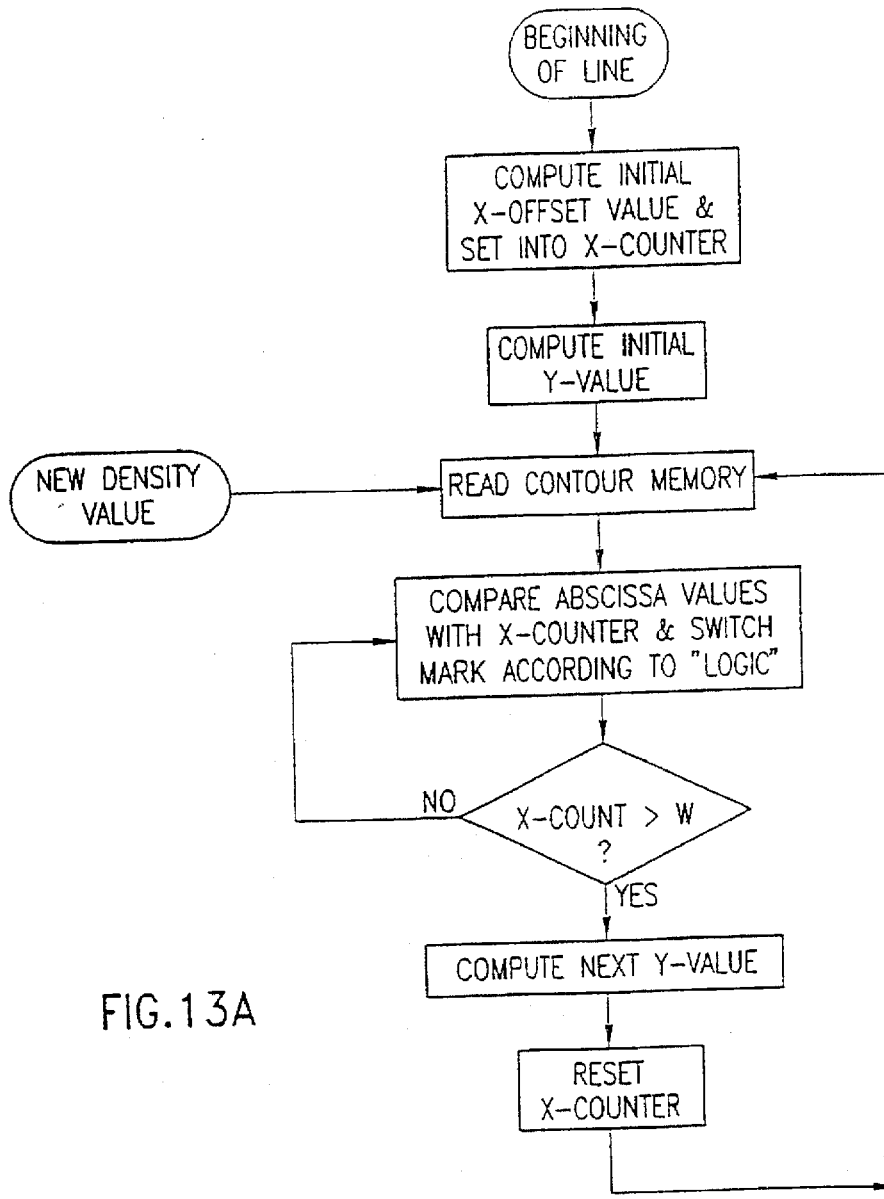
FIG. 13A is a flow diagram illustrating operation of the dot generation apparatus of FIG. 7 using the dot shape information of the type shown in FIG. 10 in controlling the laser printer to produce desired printing dots.
FIG. 13B is a logic table illustrating the decision rules for controlling the laser printer.

As seen clearly in FIG. 13A, the shape memory is readdressed and next shape information is extracted therefrom whenever any one of the following three events occurs:

A. a next pixel is reached or, preferably, a next image density value is input (i.e. when a next pixel having a different image density value) is reached;

B. a cell boundary is intersected;

C. a next line begins.

It is a particularly advantageous feature of the present invention that the average rate at which memory 60 is addressed for typical screening operation is relatively low, as compared with the prior art. For example, if the input image is supplied at a resolution of 300 pixels per inch and the screen mesh has a pitch of 150 cells per inch, the addressing rate is not more than 450 per inch of beam scan. If event A occurs only upon a change in input density values, the addressing rate may be further significantly reduced, as by a factor of approximately 3. In the prior art, a typical addressing rate is about 2000 per inch, equal to the resolution of a laser plotter.

The shape information which is extracted from shape memory 60 includes abscissa values X1, X2, X3, X4 . . . retained in output registers 98 and a polarity bit retained in an output register 99. It is assumed that X1<X2<X3<X4. In the illustrated embodiment of FIG. 7, a maximum of four abscissa values is shown. Should less abscissa values exist for a given Y, dummy values, greater that W, are set into the corresponding output registers 98. As noted above, any suitable number of abscissa values may be accommodated in practice, by providing a suitable number of comparators and output registers.

Each of comparators 100 receives the X counter contents on the count bus 103 and the abscissa values from output registers 98. Each comparator 100 continuously compares the contents of the X counter, which represent the current horizontal location of the laser beam relative to the current cell, with a respective one of the abscissa values X1 . . . X4, which represent horizontal locations of dot edge intersections with scan lines.

The outputs of comparators 100 as well as the polarity bit from output register 99 are supplied to finite state logic circuitry 104 which comprises combinatorial logic operative to generate a binary marking signal to laser beam control circuitry 24 (FIG. 1) essentially according to the truth table set forth in FIG. 13B.

The output of circuitry 104 causes the laser beam to be in an appropriate ON or OFF state at any given instant. It is appreciated that switching between the two states can occur at an instant of time that corresponds to any one of the fast clock pulses received by X counter 102. Accordingly the laser beam writing can be determined with corresponding fineness, typically 5–10 times finer than the scan line spacing, when a high quality conventional laser plotter is employed.

It is a particular feature of the present invention that this high degree of fineness is achieved without requiring that any component of the apparatus of FIG. 7, with the exception of the X counter 102, the comparators 100 and the logic circuitry 104, have correspondingly high speed response capabilities.

Figure 7C:
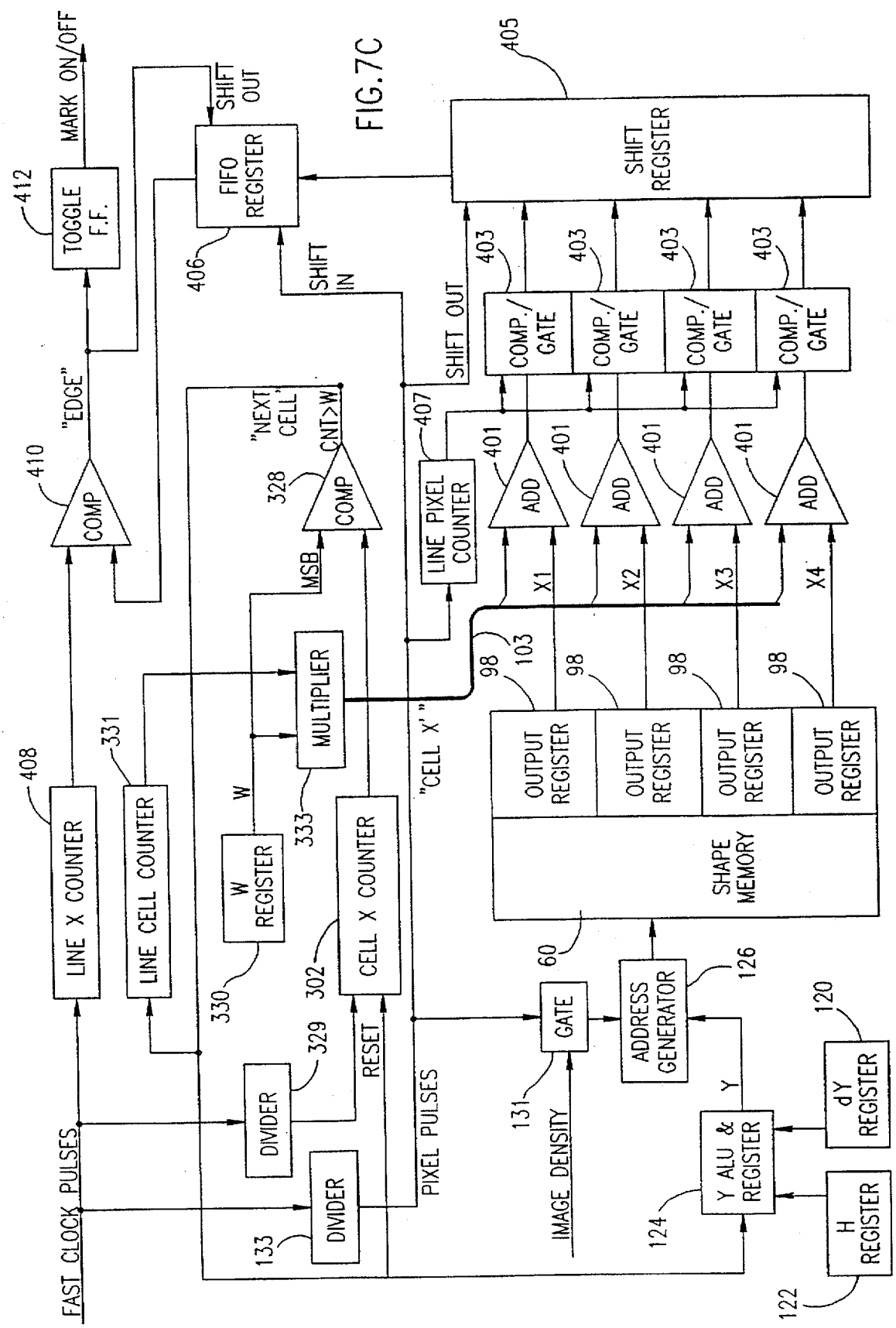

A further reduction in the number of components requiring high speed response capability is provided by a first alternative embodiment, which will be explained with reference to FIG. 7C.

In common with the embodiment illustrated in FIG. 7A and described hereinabove, the flowing operations occur in a similar manner: The contents of an X counter 302, here termed a "cell X counter", are continuously compared by comparator 328 with the most significant bits of cell width W and when exceeding it, a "next cell" signal is provided by the comparator 328. This signal resets the cell X counter 302 and causes the Y ALU 124 to compute the next Y value. Accordingly and according to input image density value, the address generator 126 generates an address in the shape memory 60. The contents of the corresponding address location are read out into output registers 98.

As distinguished form the embodiment of FIG. 7A, the pulses fed to the cell X counter 302 are derived from the input train of fast clock pulses through a divider 329 and thus are notably slower. Corresponding scaled values, e.g. only corresponding most significant bits of the digital representation of W, are fed to the comparator 328.

Each occurrence of the "next cell" signal is counted by a "line cell counter" 331 which thus represent the number of cells between the beginning of a scan line and the cell being currently computed. The contents of line cell counter 331 are multiplied at a multiplier 333 by the cell width value W, which is scaled to plotter abscissa X'. the result, denoted "Cell X'" thus represents the location along X' of the left boundary of the cell being currently computed.

Cell X' is added by adders 401 to the contents of each output register 98, whereby null value reset to zero, and the results applied through a comparator 403 to a shift register 405. It is noted that in this embodiment the abscissa values in the dot shape memory 60 are also scaled to X'. The shift register thus contains the X' values, i.e. the locations along the current scan line, of the edge points within the cell currently being computed.

Each of the comparators 403 receives a second input from a pixel line counter 407, which is reset at the beginning of each marking line and counts the pixel pulses provided by divider 133. The comparator 403 multiplies the pixel count, obtained from counter 407, by the constant value of the pixel width (scaled to X'). It also retains the product form the just previous count. The comparator 403 compares both these products with the value received from adder 401 and passes that value on to shift register 405 only if it lies between the two product values. All other inputs to the shift register 405 are set to null value.

The pixel pulses for divider 133 are also applied to the shift register 405 and to a FIFO register 406 so as to cause the entire non-null contents of the shift register to be shifted out and into the FIFO register. The FIFO register 406 thus accumulates, in rising sequence, X' values of dot edge points along the current scan line.

The train of fast clock pulses, which is synchronous with the marking beam motion, is input to a "line X counter" 408, witch at the beginning of a scan line is set to the X-offset value. The contents of counter 408 thus represent the current position of the marking beam along the scan line, relative to the left boundary of the first cell.

The contents of line X counter 408 are applied to one input of a comparator 410. The other input of that comparator comes from the output of FIFO register 406. When the two input values are equal, signifying that the marking beam currently is at an edge point of a dot, an "edge" signal is issued by the comparator.

The "edge" signal causes a toggle flip-flop 412 to change its binary state. Its output value, which is denoted as MARK ON/OFF and applied to the marking beam controller, switches accordingly between Marking and Non-Marking states. The "edge" signal is also applied to the FIFO register 406 so as to cause the next value in sequence to be output. This process continues until the end of the scan line is reached.

Computations at the beginning of each scan line and at the beginning of a plot proceed essentially as in the embodiment of FIG. 7A described hereinabove.

It is appreciated that only the line X counter 408 the comparator 410 and the toggle flip-flop 412 need be fast. More over, the rest of the circuitry need not be synchronized with the motion of the marking beam. It is also appreciated that the values in the shift register 405, the FIFO register 406 and the line X counter 408 need be represented by only a sufficient number of least significant bits so as to avoid confusion between the most distant successive edge points along a line.

Another way of reducing the high-speed response requirements is provided by a second alternative embodiment, also illustrated in FIG. 7A. This second embodiment is essentially similar to the preferred embodiment described hereinabove, except that the fast clock pulse, as well as the derived pixel pulses and the provision of density values from the CPU, are not synchronized with the motion of the marking beam. The output of the logic 104 is fed, as a binary signal, into a line buffer register or FIFO register (not shown). That binary signal is subsequently read out of the buffer or FIFO register, employing another fast clock pulse train, which is synchronous with the beam motion, and is operative to switch the beam on or off accordingly.

It will be appreciated that in this second alternative embodiment only the output circuit of the buffer or FIFO register need be as fast as the synchronous clock pulses. The speed of the other circuits may be advantageously reduced in two cases: 1) If the marking device has a relatively short duty-cycle for each line, the speed may be reduced to the average speed over the cycle. 2) If a plurality, n, of identical circuits are provided, they can be employed to generate the screen signals for sequentially alternating lines and thus each one need only run at a speed that is n times slower than the final clock pulses.

The embodiment of the invention described above provides enhanced screening principally due to the elimination of prior art limits on dot configurations and to the realization of relatively high horizontal resolution for the dots.

Figure 14A:
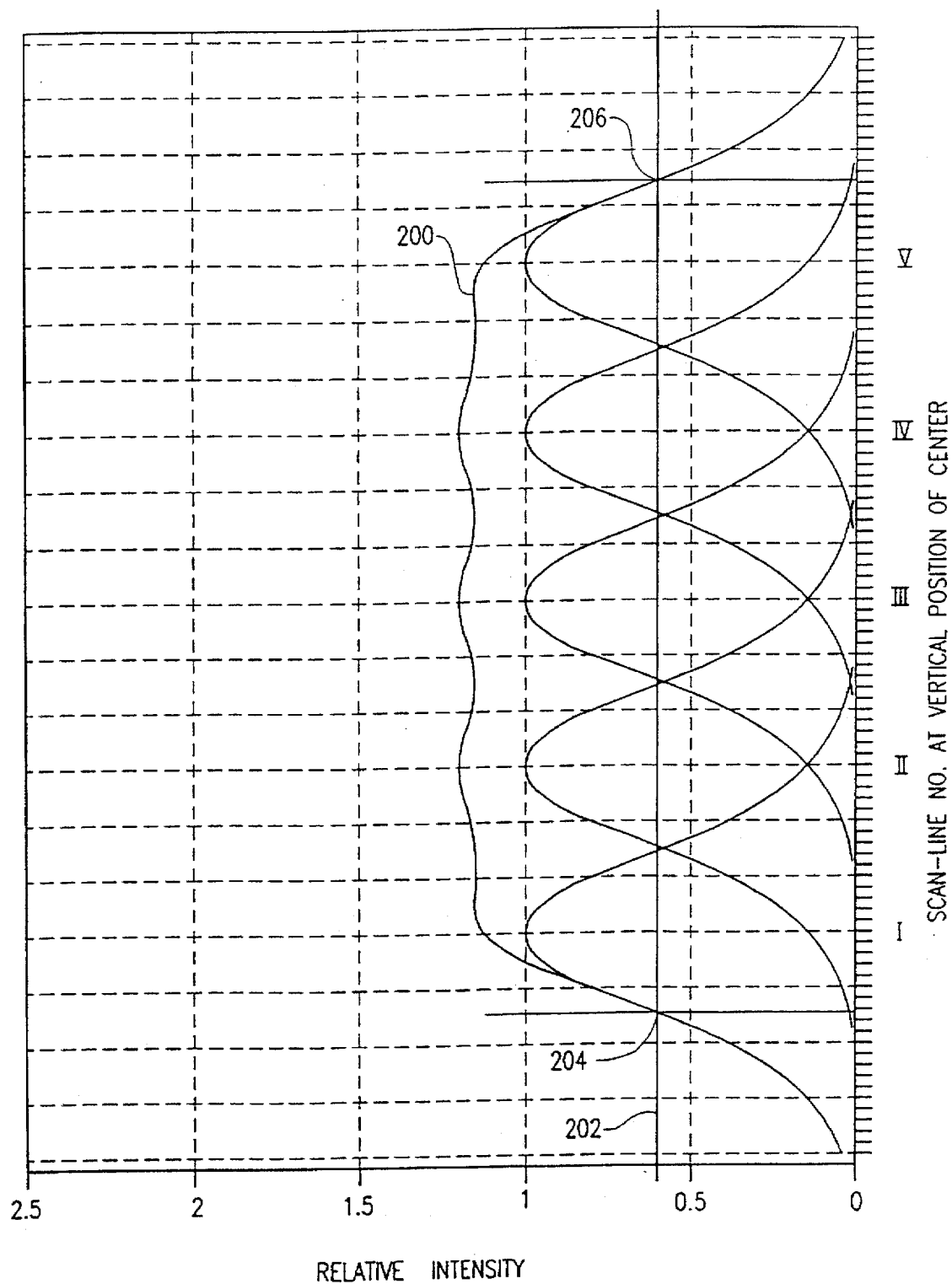
FIGS. 14A, 14B and 14C are illustrations of resolution enhancement achieved by use of varying mark intensity in accordance with another preferred embodiment of the present invention.
Figure 14B:
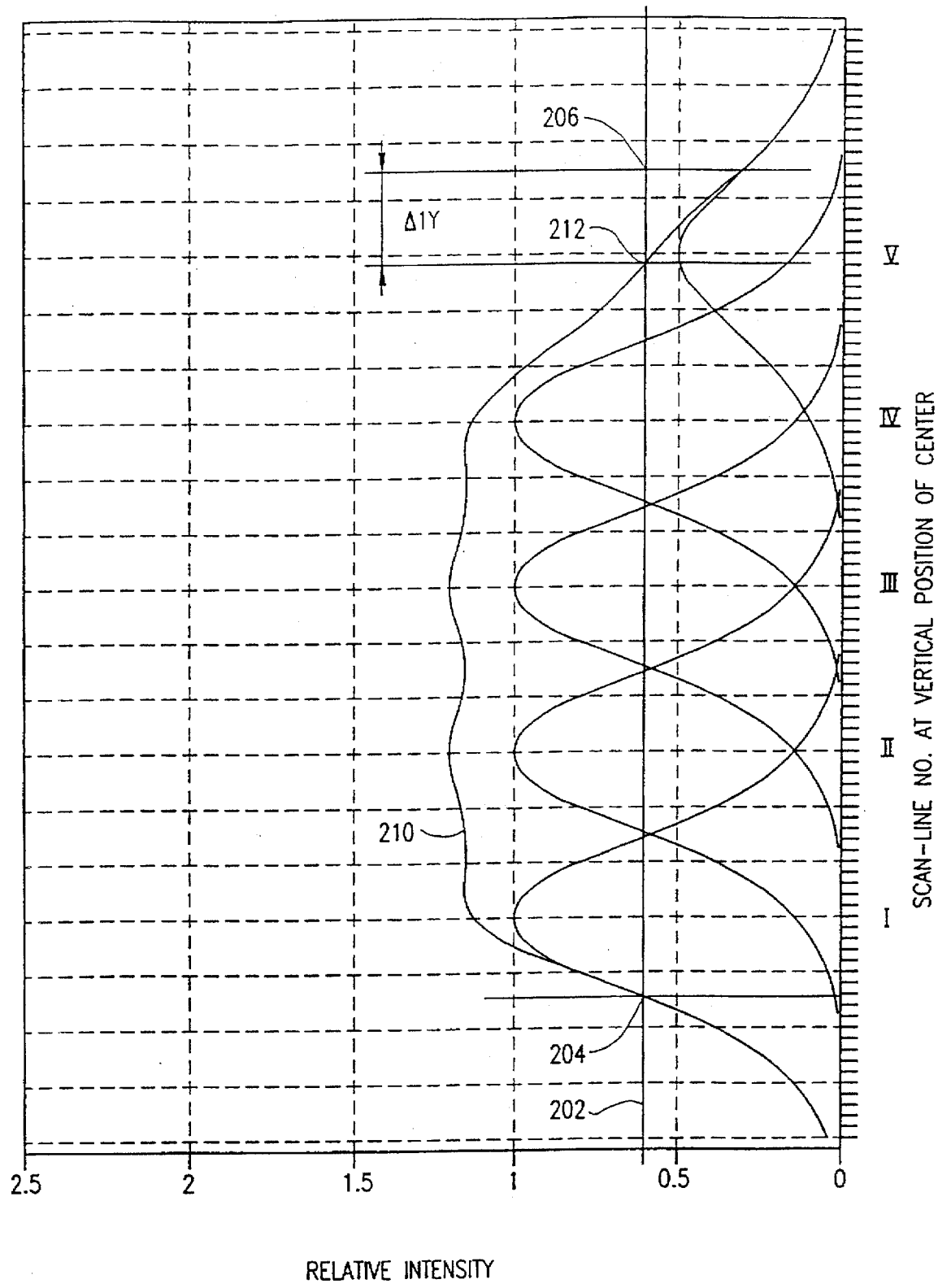
Figure 14C:
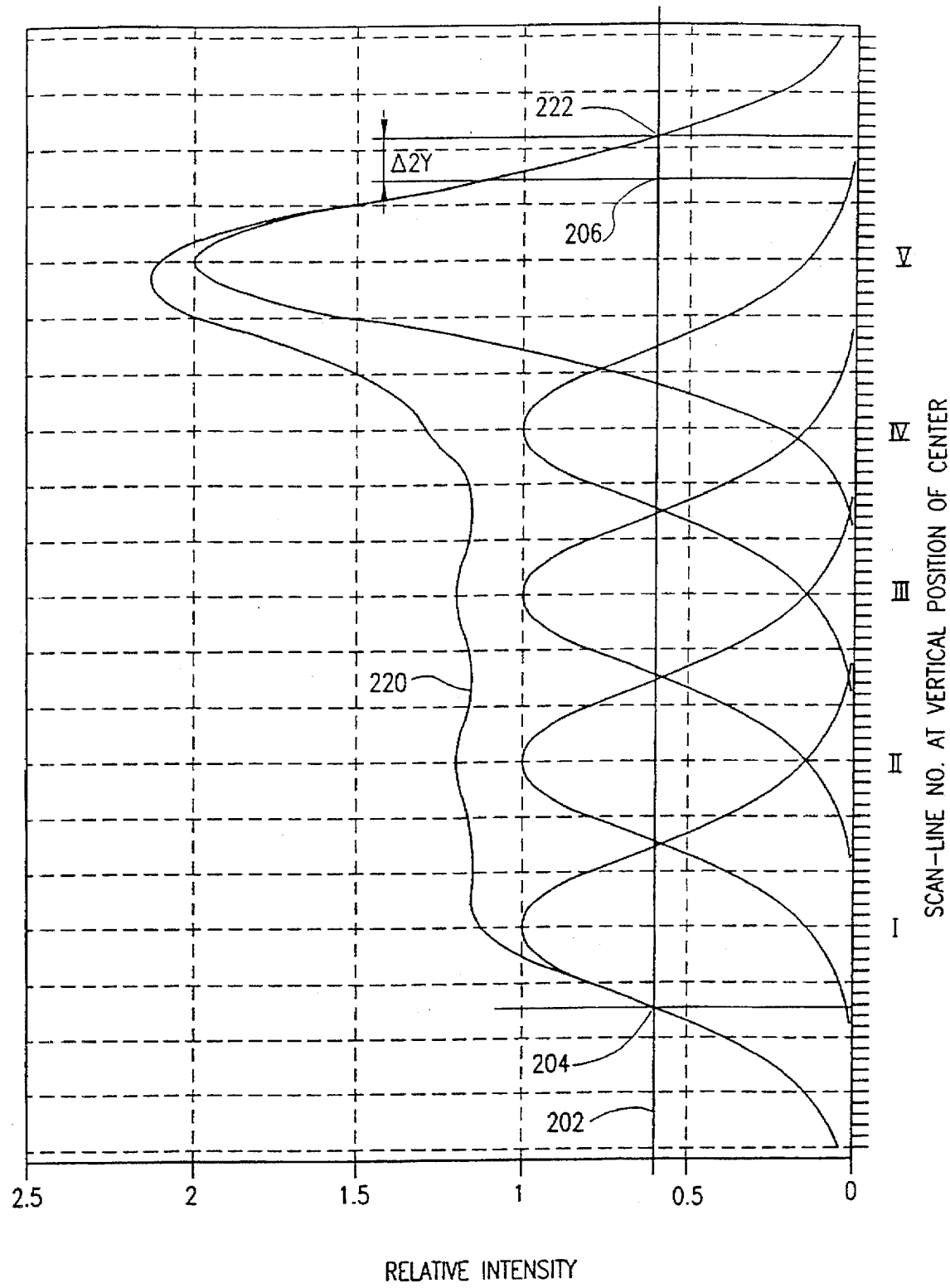

Reference is now made to a further embodiment of the present invention which provides further enhanced screening. Referring now to FIGS. 14A–14C, there are seen schematically microscopic cross sections of laser beam energy along a vertical line parallel to the Y' axis on the surface of a medium. The medium, such as film, is exposed along a plurality of adjacent scan lines parallel to the X' axis.

The specific illustrated example of FIGS. 14A–14C is a dot that vertically subtends five scan lines. The energy distribution of the laser beam at each of the five scan lines is illustrated by bell-shaped curves, approximately representing a Gaussian function and designated by indices I–V. The total energy distribution on the film over the dot, which is the sum of the energy distributions of all five scan liens, is indicated in FIG. 14A by a line 200.

The medium usually employed for plotting screened images has a very steep D/logE characteristic, causing the film to apply an effective threshold to incoming marking energy with the result that wherever the marking energy is above the threshold level, there is full marking, i.e. the film turns totally black and conversely wherever the marking energy is below the threshold no marking is provided. Accordingly, the location at which a spatially varying marking energy input at the medium crosses the threshold defines the boundary between marked and non-marked areas on the medium.

In FIG. 14A, the threshold level is indicated by a line 202. The two points of intersection 204 and 206 between line 200 and line 202 thus define the edges of the marked dot along the indicated vertical line. In the example illustrated in FIG. 14A, the beam intensity is uniform for all scan lines and thus, for the purposes of the discussion that follows, point 206 is termed the "normal edge position".

FIG. 14B is similar to FIG. 14A, except that it illustrates a case wherein the beam intensity at scan line V is reduced with respect to the beam intensity at all other scan lines. A line 210, which corresponds to line 200 in FIG. 14A and which represents the total energy distribution across the dot, assumes lower values in the vicinity of the position of line V, as compared with the case of FIG. 14A. As a result, the location 212 at which line 210 intersects line 202 adjacent to scan line V is closer to point 204 than is point 206, by an amount delta1 (Y).

FIG. 14C is similar to FIG. 14A, except that it illustrates a case wherein the beam intensity at scan line V is increased with respect tot he beam intensity at all other scan lines. A line 220, which corresponds to lien 200 in FIG. 14A and which represent the total energy distribution across the dot assumes higher values in the vicinity of the position of line V, as compared with the case of FIG. 14A. As a result, the location 222 at which line 220 intersects line 202 adjacent to scan line V is further from point 204 than is point 206, by an amount delta2 (Y).

It is appreciated that varying the intensity of the marking beam along the scan line nearest the upper or lower edge of a dot shifts the vertical position of that edge in the dot by a fraction of the interline distance S. Increasing the intensity from the nominal intensity shifts the edge outwardly, while decreasing the intensity shifts the edge inwardly.

Preferable, a finite number if intensity values is employed, for producing a finite number of corresponding edge shifts. The edge shift values are selected to be generally evenly spaced and the corresponding intensity values are determined empirically, inasmuch as the relationship therebetween is not entirely linear.

It is appreciated that vertically shifting the edges of dots by a fraction of the interline separation S in the manner described herein above is effective to significantly increase the vertical resolution of the plot. The increase in vertical resolution thus achieved can be employed for any one or more of the following advantageous functions:

a. designing the dot shape with a high vertical resolution;
b. reducing the variation in vertical edge position between dots due to their random relationship with the scan-line structure; and
c. smoothing edges of a dot which lie at a small angle with respect to the horizontal.

Figure 17A:
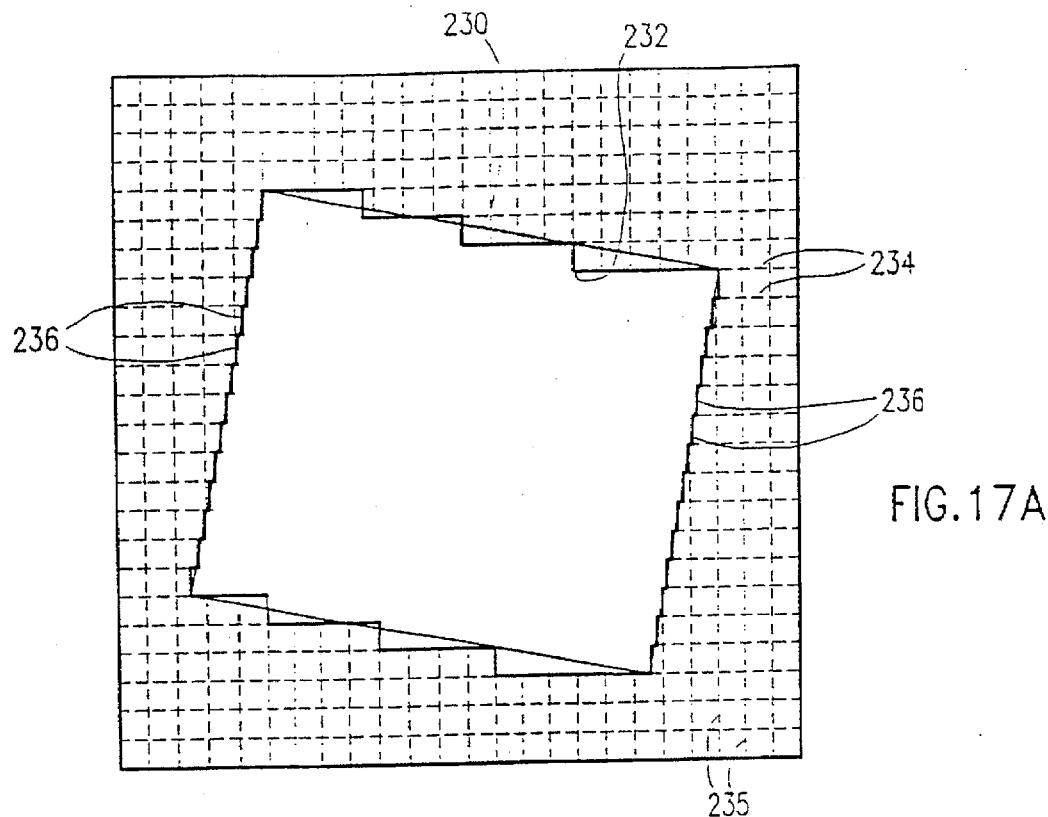
FIGS. 17A and 17B illustrate the enhanced interline resolution effects produced by the use of varying intensity marking in accordance with a preferred embodiment of the present invention.
Figure 17B:
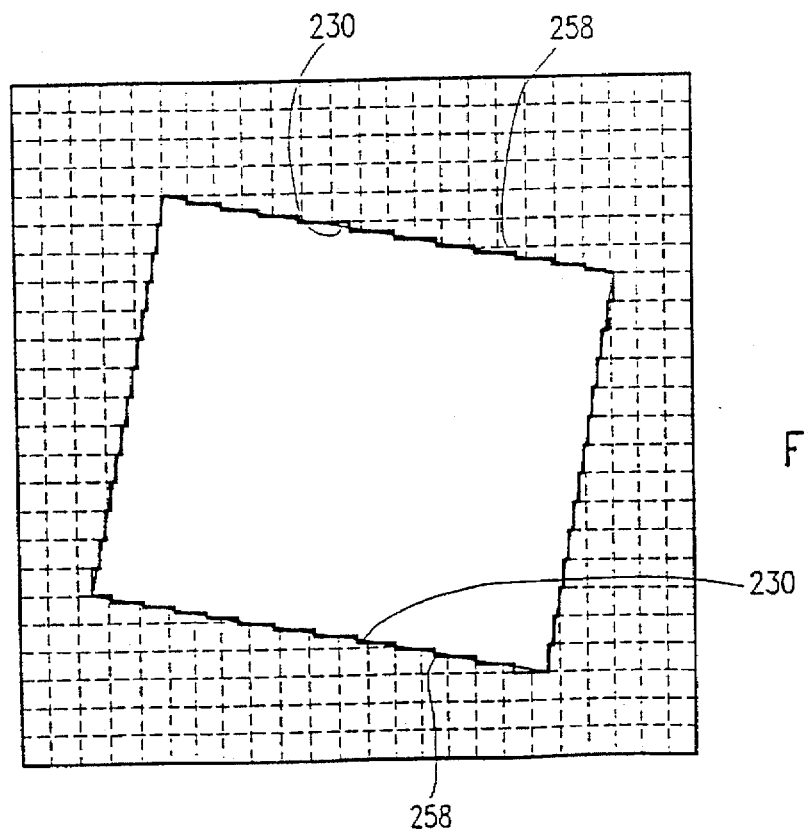

By way of example, function c. will now be explained with reference to FIGS. 17A and 17B. FIG. 17A illustrates the edges of a normally rectangular and somewhat inclined dot. The design outline 230 is the theoretical ideal shape of the dot and the jagged outline 232 represent the result that is produced in accordance with the embodiment of the present invention described above in connection with FIGS. 1–13B.

The distances between the dashed horizontal lines 234 in the background are equal to S, the nominal distance between adjacent scan lines. The distances between the dashed vertical lines 235 is here also set to be equal to S.

It can be seen that the left and right edges of the dot include short vertical segments 236 which are horizontally shifted from neighboring such segments 236 by a distance which is a fraction of S, reflecting the enhanced horizontal resolution achievable with the present embodiment of the invention due to the provision of fast clock rate inputs to the X counter 102 (FIG. 7), as described hereinabove with reference to FIG. 13A.

It can be seen that the right and left edges of the dot appear to be relatively smooth, while the top and bottom edges appear more ragged. In accordance with a preferred embodiment of the invention, using the technique exemplified in FIGS. 14A–14C, the raggedness of the top and bottom edges of the dot in FIG. 17A can be reduced, as seen in FIG. 17B.

The technique of edge smoothing by varying the intensity of the laser beam will now be described with reference to FIG. 16, which illustrates the construction of part of an inclined upper edge of a dot. Two horizontal lines 250 and 252 delineate the center lines of two adjacent scan lines and an inclined line 254 represents a portion of the nominal upper edge 230 of the dot. The vertical lines 256 represent arbitrary units of distance along the X axis.

Below lines 250, 252 and 254 and in registration with vertical lines 256, there are illustrated control signals to the laser beam control circuitry 24 of the laser plotter 26 (FIG. 1), superimposed over schematic outlines of the corresponding nominal mark areas along the beam paths. It is seen that at a point corresponding with the intersection of line 254 with line 250, the laser is switched off, thus terminating a first line. This point is at an arbitrary X position, here indicated as X=A. Up to this point the intensity of the laser beam is reduced in a stepwise manner, form full intensity F to a first lower level F−1 and then to a second lower level F−2.

During the scan of the next line 253, the laser plotter is operated at full intensity F until the line X=A is reached. Thereafter, the laser beam intensity is increased over the nominal full intensity to an intensity level F+3, typically three levels above the nominal full level. Thereafter it is reduced to a level F+2, typically two levels above nominal full level and thereafter to a level F+1, typically one level above nominal full level and finally to the nominal level F.

Figure 16:
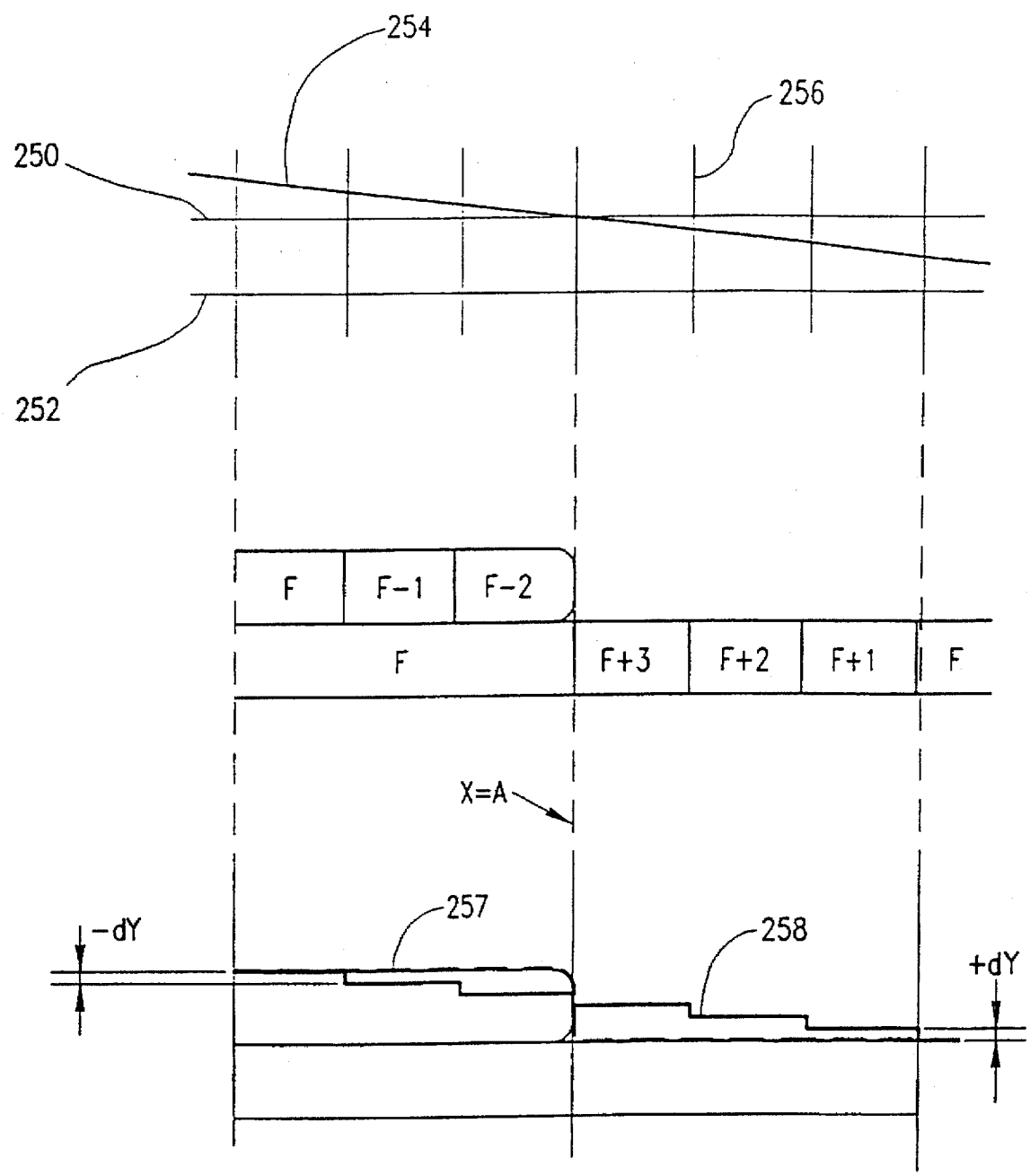
FIG. 16 is an illustration of part of a pair of adjacent lines constructed with varying intensity marking in accordance with a preferred embodiment of the present invention.

At the bottom of FIG. 16 there is illustrated, in horizontal registration with the top drawings, the resulting marks on the film for the corresponding line segments. The dashed line 257 represents the upper edge of the mark in the absence of beam intensity modulation and is seen to exhibit a single jump equal to the separation S.

On the other hand, employing beam intensity modulation with the above described technique minimizes the coarseness of the jumps between adjacent scan lines, as can be seen from a consideration of the resulting edge line, indicated by a reference numeral 258, which includes a plurality of jumps, each of which is dY, a fraction of the separation S, determined by the number of variations of intensity level that are employed. The overall effect is a relatively smooth inclined edge 258 that more closely approximates the design outline 254. This technique is employed in much the same manner for both the upper and lower edges of a dot.

Figures 20A, 20B:
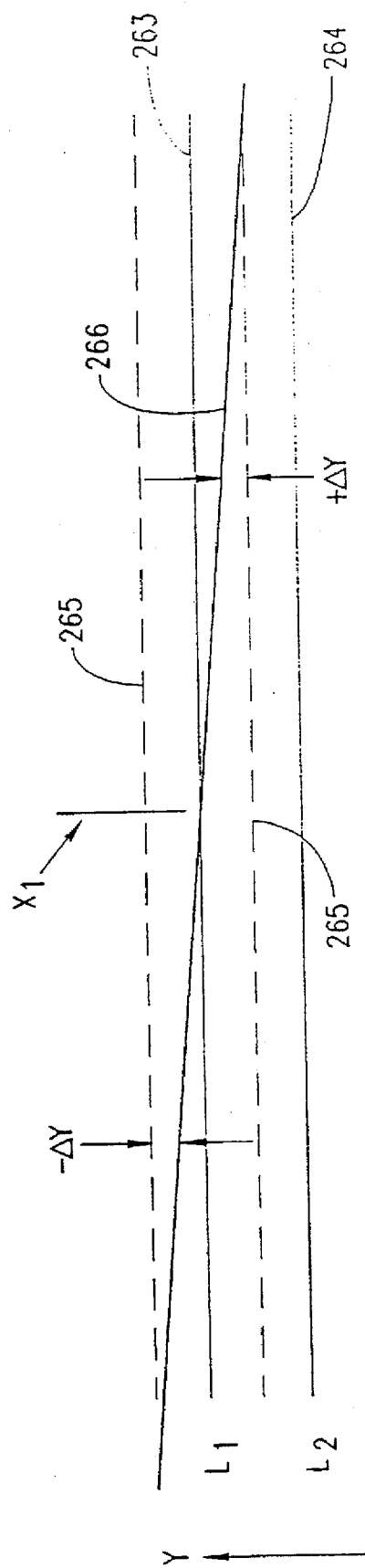
FIGS. 20A and 20B are illustrations of the derivation of intensity information to be employed in interline resolution enhancement using variable intensity marking.

Reference is now made to FIGS. 15, 20A and 20B, which illustrate the structure and operation of a preferred embodiment of the invention that provides fine control of the vertical position of edges, particularly as applied to smoothing of inclined edges in the manner described hereinabove. The apparatus of FIG. 15 is similar to that of FIG. 7 except in that it includes a Z memory 260 and associated output register 261.

The Z memory 260 contains additional information for some or all of the lines for which information is stored in the shape memory 60 and is addressed by address generator 126 in a corresponding manner. The additional information for each line preferably consists of a relatively small number, typically 10–40, of beam intensity values. These values are each stored in a separate sub-location which is addressable by the most significant bits on the count bus 103 and represent a distribution of intensity values along the scan line extending across the width of a cell.

The operation of the apparatus of FIG. 15 may be understood more clearly from a consideration of FIGS. 20A and 20B, which represent, respectively, an edge of a dot intersecting a pair of scan lines L1 and L2 and the corresponding contents of the Z memory for scan lines L1 and L2. Lines 263 and 264 represent the center lines of scan lines L1 and L2 respectively and dashed lines 265 define the upper edge of the mark of the corresponding line when it is the top one to be marked and when normal beam intensity is applied along it.

In FIG. 20A, the nominal edge of the dot is represented by an inclined line 266, which intersects the center line 263 of scan line L1 at a X location labeled X1. It is at location X1 that the laser beam writing scan line L1 is turned off, in accordance with a suitable entry in the shape memory 60.

FIG. 20B illustrates in, horizontal registration with FIG. 20A, the contents of the Z memory 260 for lines L1 and L2. It is seen that at memory locations corresponding to physical locations along scan line L1 approaching X1, i.e. where the dot edge line 266 increasingly lies below the nominal outer edge of the scan line L1 as indicated in FIG. 20A by the notation −delta Y, the intensity of the laser beam decreases from the nominal intensity indicated by 0 to −2, up to X1, where the beam is turned off.

At memory locations corresponding to physical locations along scan line L2 approaching X1, the intensity of the laser beam remains the nominal intensity, as indicated by O. Following X1, i.e. where the dot edge line 266 increasingly approaches the nominal outer edge of the scan line L2 as indicated in FIG. 20A by the notation +delta Y, the intensity of the laser beam rises to an extremely high intensity indicated by +3 and thereafter gradually decreases to the nominal intensity indicated by 0.

It is thus seen that by storing and utilizing appropriate signals effecting intensity increases and decreases in the scan line, as described hereinabove in conjunction with FIG. 15, the jaggedness in the representation of an inclined, generally horizontal edge of a dot can be laminated, as illustrated in FIG. 16. In an alternative embodiment, the intensity values necessary to achieve the smoothing effect or vertical resolution enhancement as discussed above, need not be stored but can be calculated from edge point data extracted from storage of adjacent lines, using interpolation and possibly extrapolation to establish the line segments for each intensity, level, essentially as explained above with reference to FIG. 16.

Figure 18A:
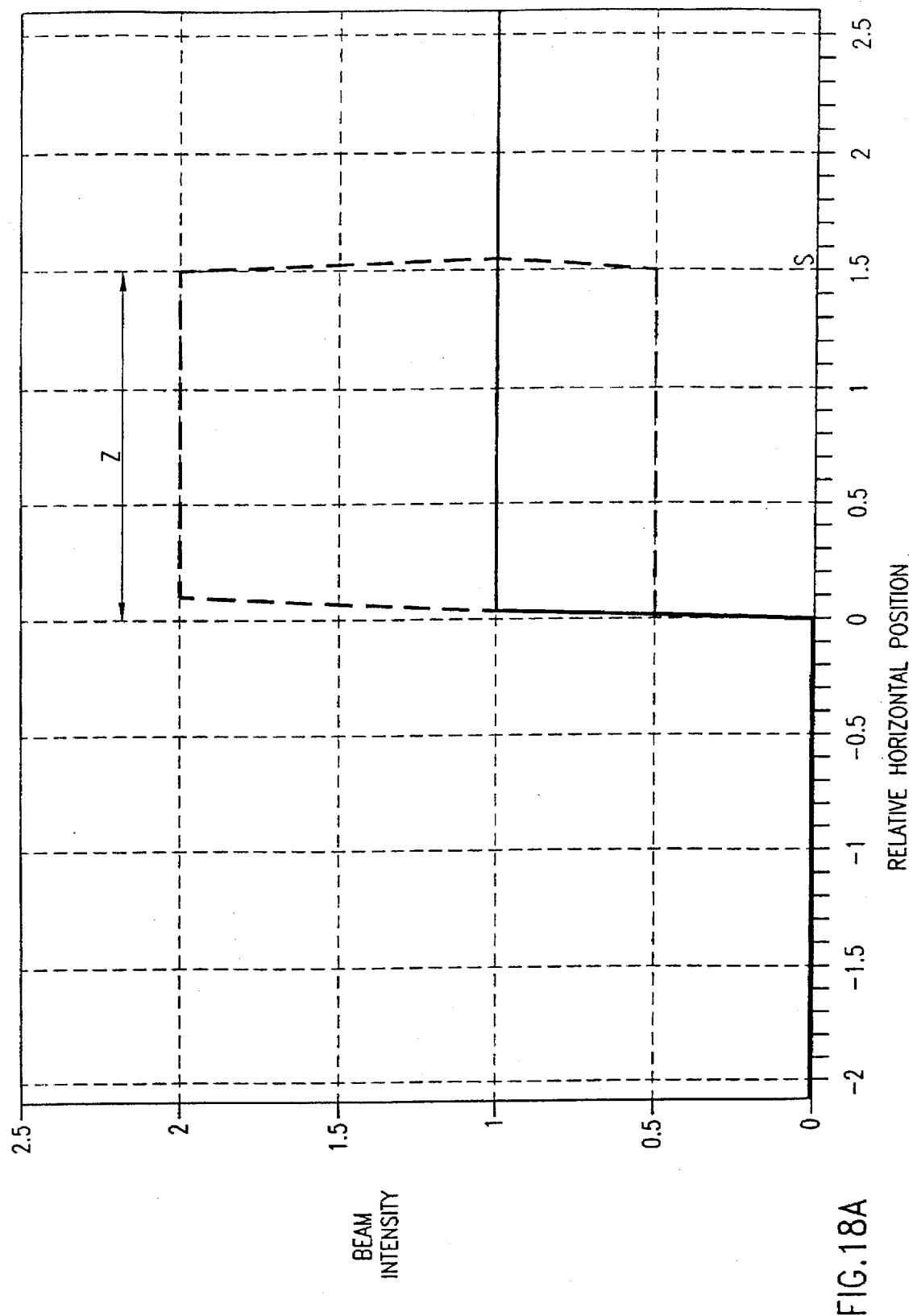
FIGS. 18A and 18B are illustrations of resolution enhancement achieved by use of varying beam intensity along the scan line in accordance with another preferred embodiment of the present invention.
Figure 18B:
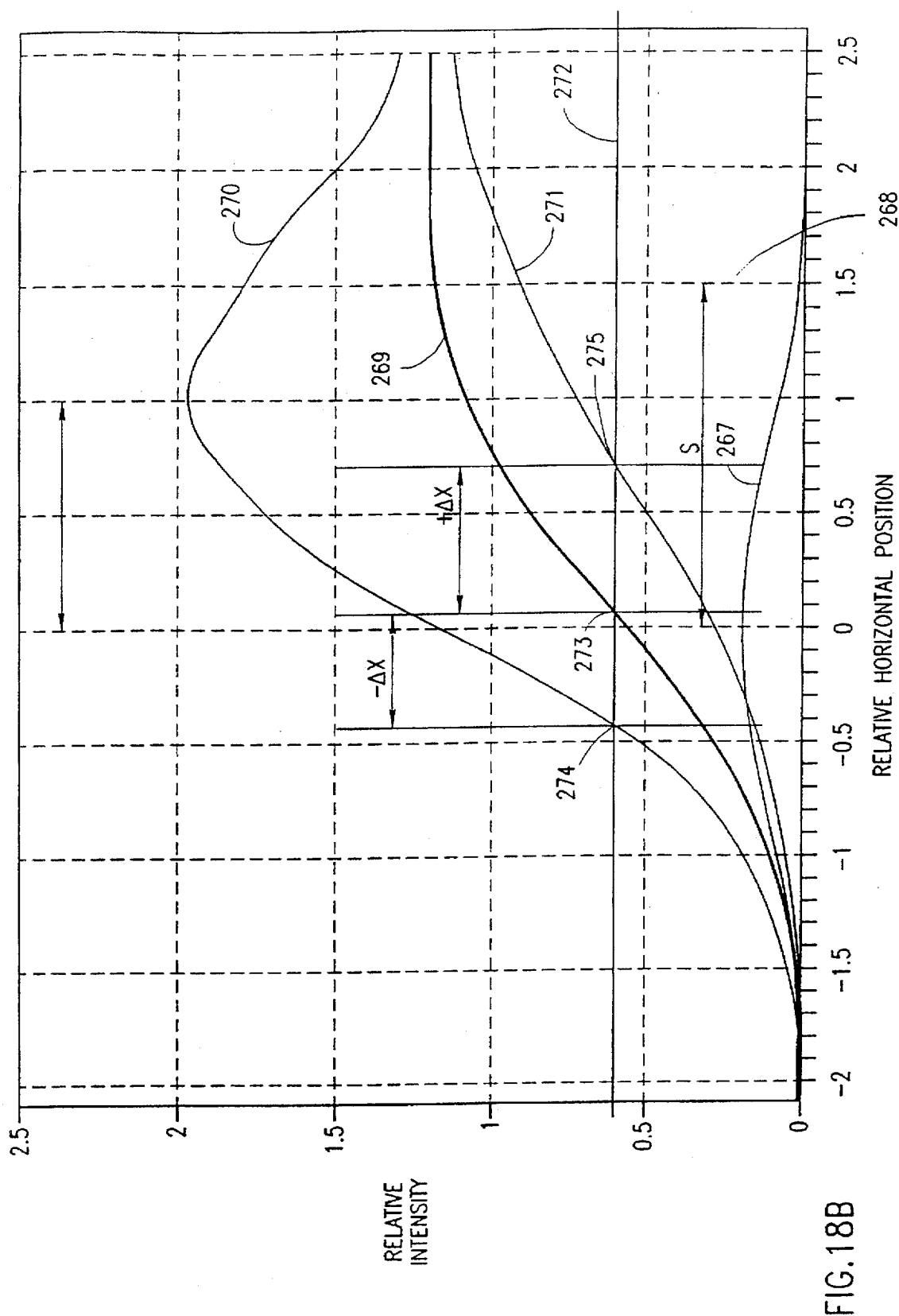

Reference is now made to FIGS. 18A and 18B, which illustrate respectively the variation in beam intensity and the resulting variation in relative exposure in a microscopic horizontal section, along the centerline of a scan line for several different cases. The scale along the bottom of FIGS. 18A and 18B indicates the relative position of the laser beam along the scan line. The point at which the beam is switched on is indicated by 0. Each unit on the scale equals the parameter sigma of the Gaussian function that is assumed to characterize the cross-sectional distribution of the laser beam intensity. Such a Gaussian function, drawn with an arbitrary vertical scale and centered about the switching point 0, is indicated by reference numeral 267.

When a laser beam having a Gaussian distribution of the type indicated by reference numeral 267 scans a medium, the energy impinging upon the medium at any one point along the scan line is the accumulation of the energy from each elementary segment of the beam profile that traverses that point, i.e. the time integral of the beam energy distribution at the point, as the beam moves along its scan path.

Mathematically, the resultant energy distribution along the scan line is obtained by the convolution of the beam energy distribution with a marking function, which in the present example is shown in FIG. 18A. FIG. 18A indicates that the laser beam intensity may assume one of several possible levels over the distance range O–S beginning with the switching point, hereinafter referred to as the Z-range. Thereafter the beam intensity is the nominal intensity.

A curve 269 represents the cumulative energy distribution along the centerline of the scan line when the laser beam is at a nominal intensity over the Z-range. The energy distribution is seen to gradually rise from zero to a constant value. Here the intensity scale is arbitrarily chosen so that this constant value is 1.2, which is equal to the value of the average total vertical energy distribution over the positions of scan lines II, III and IV in FIG. 14A. Curve 269 is thus seen to consistently represent the horizontal energy distribution across a vertical edge of a dot that extends over a plurality of scan lines and that has been marked by a nominal intensity laser beam.

Curves 270 and 271 represent similar horizontal energy distributions in the cases that the laser beam intensity near the edge is respectively twice and a half of the nominal value, as illustrated in FIG. 18A.

A horizontal line 272 across the diagram of FIG. 18B represents the threshold level of the medium with respect to the marking beam intensity. In this example, consistent with FIG. 14A, the threshold is established at a value of 0.6. Points of intersection of curves 269, 270 and 271 with the threshold line 272, indicated by respective reference numerals 273, 274 and 275 determine the actual horizontal position of the edge of the marked scan line in each case.

It may readily be seen that with a high intensity beam, such as that represented by curve 270, the edge of the marked scan line is shifted to the left by an amount −delta X with respect to the edge produced by a nominal intensity beam. Likewise, with a low intensity beam, such as that represented by curve 271, the edge of the marked scan line is shifted to the right by an amount +delta X with respect to the edge shifts produced by a nominal intensity beam.

The relative magnitude of the edge shifts produced by variation of intensity of the beam may be appreciated by comparing delta X with the interline distance S, which is 1.5 units in the present example. It may thus be appreciated that by varying the beam intensity in the vicinity of a vertical edge of a dot during marking, that edge can be shifted left or right by a substantial fraction of the interline distance. This provides a fine control for edge position during screen plotting.

Figure 19:
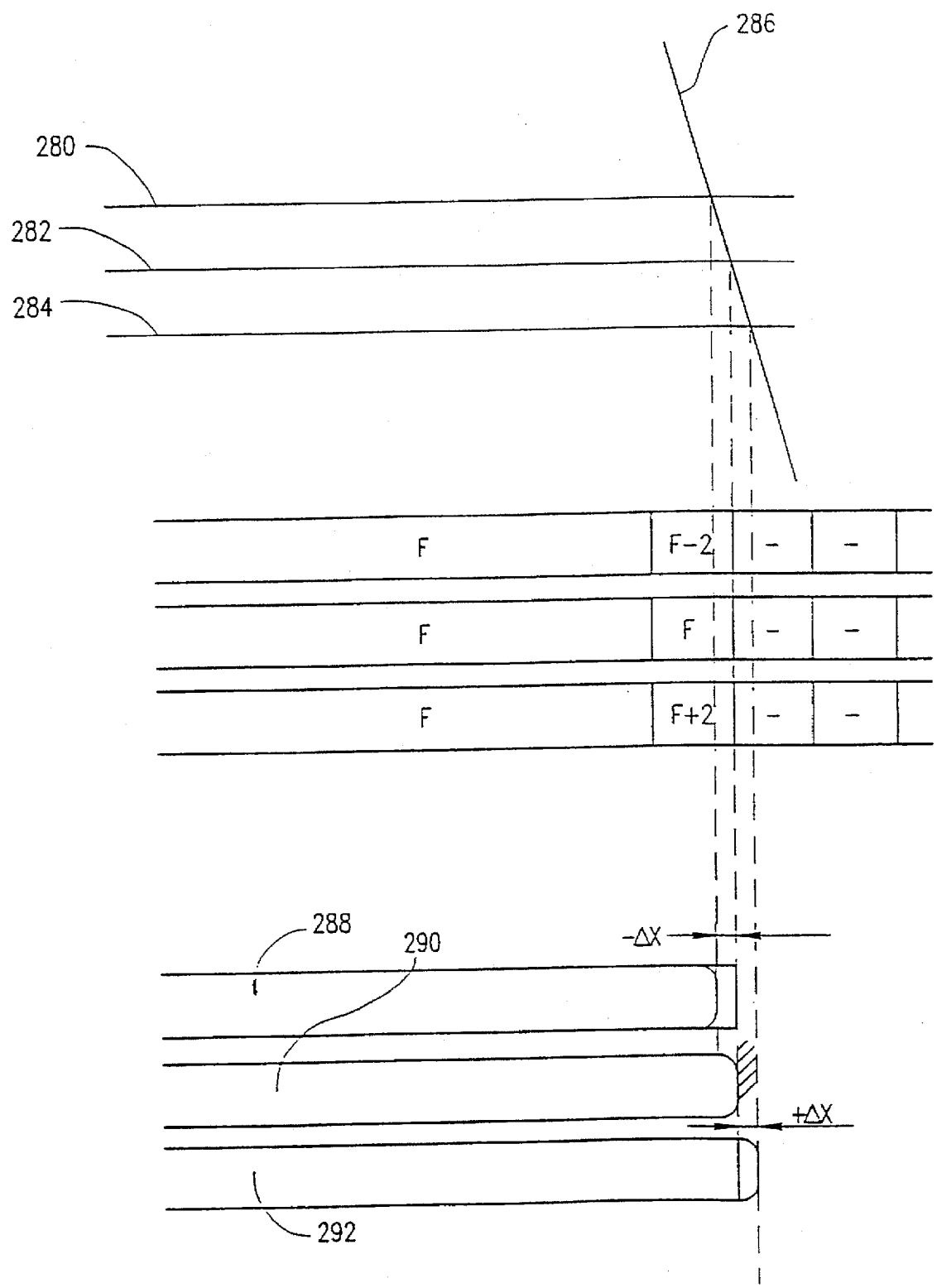
FIG. 19 is an illustration of three adjacent lines constructed with varying intensity marking to enhance the resolution in a direction along the marking lines.

Reference is now made to FIG. 19, which illustrates a horizontal shift in edge position due to beam intensity variation. Three horizontal lines 280, 282 and 284 represent centerline of three scan lines, and a line 286, which is slightly inclined with respect to the vertical, represents a nominal edge of a dot.

Below lines 280, 282, 284 and 286 and in alignment therewith are shown the contents of the Z memory 260 (FIG. 15) for the corresponding lines and subaddresses. At the sub-address closest to the edge position in each line, the intensity varies from F−2 to F and to F+2, in much the same manner as described above in conjunction with FIG. 16.

Below the contents of the Z memory 260 and in alignment therewith are shown three corresponding marking lines 288, 290 and 292, produced by a laser beam which was turned off at the same horizontal position for each of the three lines. The difference in their edge location, as seen in FIG. 19, is produced by the variation in the intensity of the laser beam just before it is turned off. Specifically, the marking line 288 has a lower than nominal intensity at its right edge, marking line 290 has a nominal intensity at its right edge and marking Line 292 has a higher than nominal intensity at its right edge. Corresponding differences of ±delta X in the horizontal position of the right edge of each line are thus produced, to more closely approximate the position of the design edge 286.

In an alternative embodiment, the intensity values necessary to achieve enhancement of horizontal resolution beyond that afforded by the clock pulses as discussed above with reference to FIG. 19, need not be stored but can be calculated for each edge point along the marking line from the least significant bits of the extracted edge point data that exceed the number of bits representing the beam position, regarding them collectively as a binary representation of an algebraic incremental X value.

Reference is now made to FIGS. 21A through 23B which illustrate the rotation of screen dots in accordance with their dot shape, or dot contour, and intensity with respect to the U and V coordinate system so as to achieve enhancement in their dot shape definition. Dots having an asymmetrical dot shape or dot contour and relatively low dot density (e.g. dots 280 in FIG. 21A) are being electronically rotated prior to their storage in dot shape memory 60 (FIGS. 7A and 7B) or dot contour memory 60 (FIG. 7C).

Figure 22A:
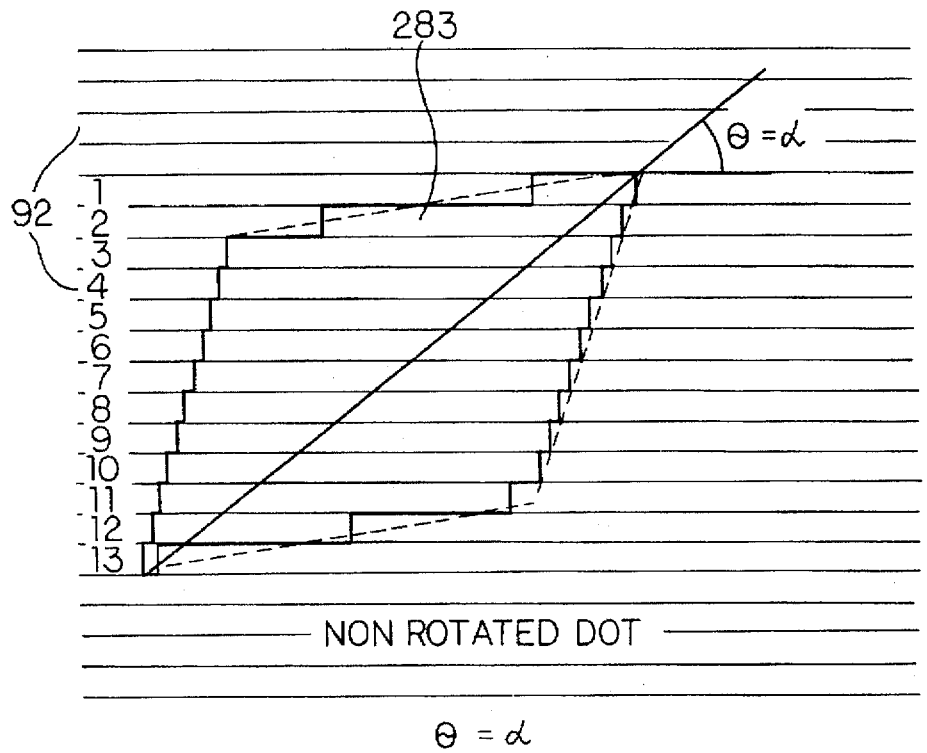
FIGS. 22A and 22B illustrate the increase in the number of marking lines in rotated dots with respect to nonrotated dots.
Figure 22B:
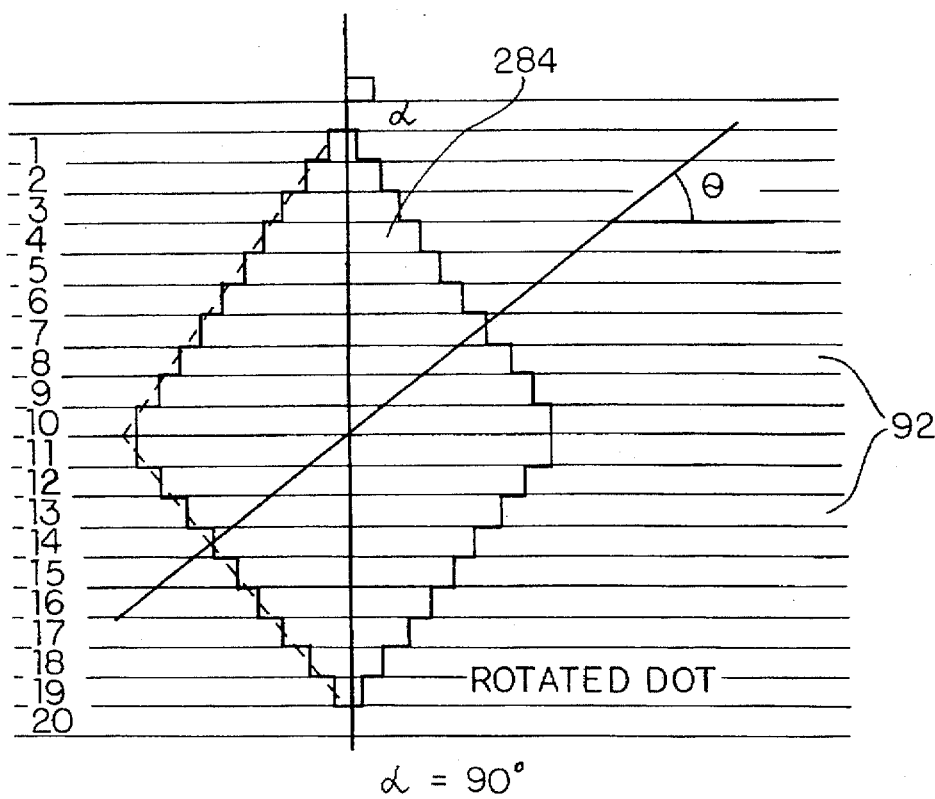

As illustrated in FIG. 22A and 22B, the dot is being rotated so as to improve the dot shape definition by increasing the number of laser scan lines 92 forming the dot. In the illustrated embodiment, two dots 283 and 284 having same size are shown. As clearly illustrated in this example, nonrotated dot 283 which longitudinal axis generally coincide with the U axis of the screen coordinates is produced by 13 laser scan lines whereas rotated dot 284 which is rotated such that its longitudinal axis generally coincide with the X' axis of the laser coordinate system is produced by 20 scan lines.

Figure 23:
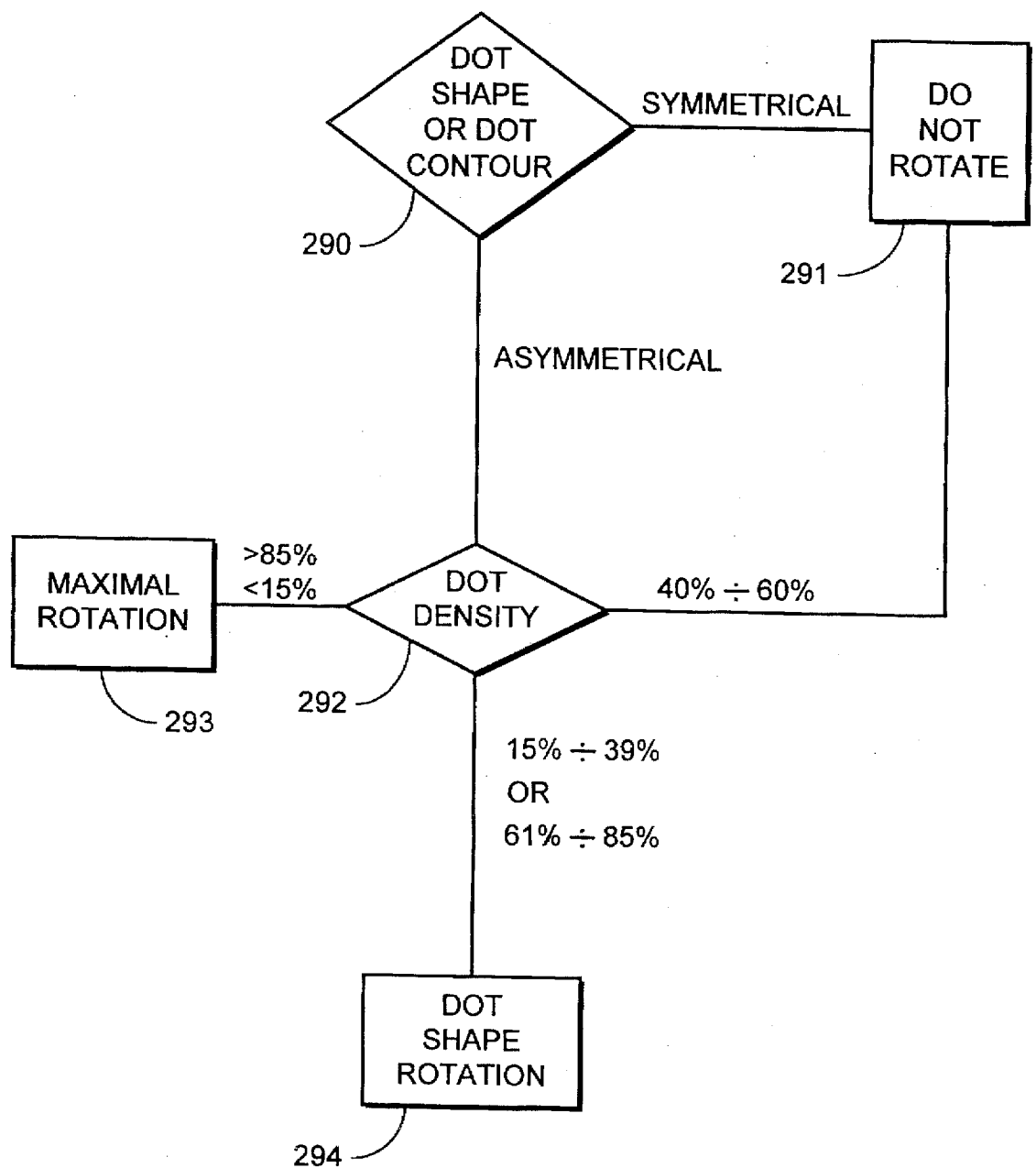
FIG. 23 is a schematic flow chart illustrating the method for determining whether and to what extent the dots should be rotated.

FIG. 23 is a flow chart illustrating the method of deciding whether to rotate a dot and to what extent. In step 290, the dot shape or dot contour is analyzed so as to determine whether it is symmetrical or not. Examples of asymmetrical dots are dots 280 and 281 (FIGS. 21A and 21B) and the dots of FIGS. 5A and 5B. An example of symmetrical dots are the rounded dots of FIG. 5C.

Figure 21A:
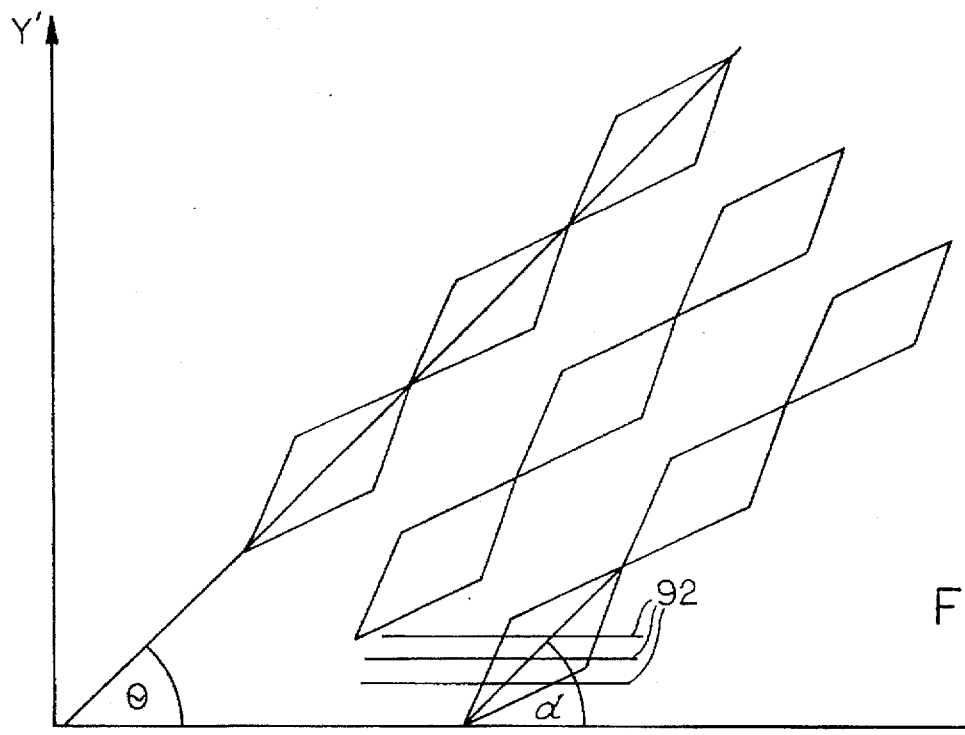
FIG. 21A and 21B are illustrations of non rotated screen dots and rotated screen dots, respectively.
Figure 21B:
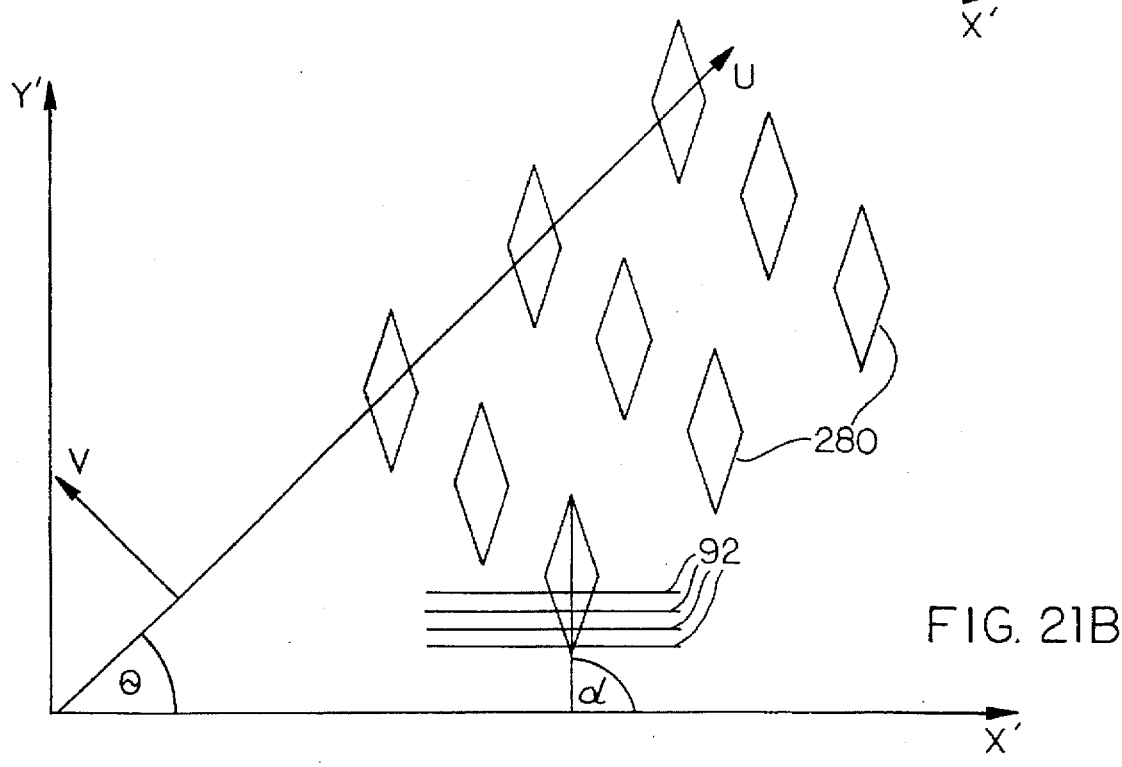

If the dot shape or dot contour is symmetrical, the dots are not being rotated as indicated by 291. If, however, the dot is not symmetrical, it is rotated if a dot density criteria is met as described below. In step 292 the dots density is determined. In the nonlimiting illustrated embodiment, if the dots density is below 15 percent or above 85 percent, the rotation is maximal as indicated by 293 and as shown for dots 280 (FIG. 21A). Dots 280 are rotated such that their longitudinal axis generally coincide with the Y' coordinate, i.e they are generally perpendicular after their rotation to laser scan lines 92 so as to achieve maximal enhancement in their resolution. Accordingly, in the illustrated embodiment, screen dots 280 (FIG. 21B) are rotated with respect to the screen angle theta in an angle alpha which is 90 degrees minus theta.

If the dots density is between 40 and 60 percent, dot rotation will result in an overlap between dots and therefore dots 281 (FIG. 21A) having a dot density of about 40 percent are not rotated, i.e. theta is equal to alpha and the method again terminates at 291.

If the dot density is in the range between 15 and 40 percent or between 60 and 85 percent, the dot is rotated in an angle smaller than 90–theta where alpha gradually increases as the dot density decreases as indicated by 294.

It will be appreciated that the dot density values specified above as determining whether and to what extent the dot shape is rotated are set solely for exemplary purposes and are not limiting in any way and that any desired dot density values can be elected for this purpose.

It will also be appreciated that while the dot rotation method described above is applicable to any dot shape or dot contour it is particularly advantageous when the dot shape information is stored in a line by line input density by input density information.

The above apparatus and techniques employed as described above for precise horizontal and vertical edge placement are also applicable to plotted patterns other than screens, such as type, solidly rendered graphic elements and line-art images.

It will be appreciated by persons skilled in the art that the present invention is not limited by what has been particularly shown and described hereinabove. Rather the scope of the present invention is defined only by the claims which follow:

Incorporated herein by reference are all of the drawings of allowed U.S. patent application Ser. No. 08/221,938 filed Apr. 1, 1994, including photographs filed under petition of Jun. 2, 1994.

I claim:

1. A method for screening an image for half-tone reproduction by image reproduction apparatus comprising a marking device which is operative to mark a medium along a multiplicity of parallel marking lines, the method comprising the steps of:

providing a digital representation of density values of an original image;

determining whether to rotate dot shape information in accordance with said dot shape symmetry and density;

rotating dot shape information if said symmetry and density criteria are met;

storing said dot shape information in its rotated on nonrotated form, said dot shape information representative of a screen function; and extracting said dot shape information from storage for said density values in the form of information that designates on and off points for each marking line.

2. A method according to claim 1 wherein said step of storing dot shape information comprising storing said dot shape information in a line-by-line arrangement in accordance with said parallel marking lines.

3. A method according to claim 1 wherein the maximal rotation is such that the longitudinal axis of said dot is generally perpendicular to said parallel marking lines.

4. A method according to claim 1 wherein the maximal rotation angle is defined by the difference between 90 degrees and the screen angle.

5. A method according to claim 2 wherein said storing also comprises storing said dot shape information representative of a screen function in an input density-by-input density arrangement.

6. A method according to claim 1 wherein said dot shape is not rotated if said dot shape is symmetrical.

7. A method according to claim 1 wherein said dot shape is being rotated if said dot shape is asymmetrical.

8. Apparatus for screening an image for half-tone reproduction by image reproduction apparatus comprising a marking device which is operative to mark a medium along a multiplicity of parallel marking lines, comprising:

means for providing a digital representation of density values of an original image;

means for determining whether to rotate dot shape information in accordance with said dot shape symmetry and density;

means for rotating dot shape information if said symmetry and density criteria are met;

means for storing said dot shape information in its rotated on nonrotated form, said dot shape information representative of a screen function; and means for extracting said dot shape information from storage for said density values in the form of information that designates on and off points for each marking line.

9. Apparatus according to claim 8 wherein said means for storing dot shape information comprising means for storing said dot shape information in a line-by-line arrangement in accordance with said parallel marking lines.

10. Apparatus according to claim 8 wherein the maximal rotation is such that the longitudinal axis of said dot is generally perpendicular to said parallel marking lines.

11. Apparatus according to claim 8 wherein the maximal rotation angle is defined by the difference between 90 degrees and the screen angle.

12. Apparatus according to claim 9 wherein said means for storing also comprises means for storing said dot shape information representative of a screen function in an input density-by-input density arrangement.

13. Apparatus according to claim 8 wherein said dot shape is not rotated if said dot shape is symmetrical.

14. Apparatus according to claim 1 wherein said dot shape is being rotated if said dot shape is asymmetrical.

* * * * *

UNITED STATES PATENT AND TRADEMARK OFFICE
CERTIFICATE OF CORRECTION

PATENT NO. : 5,742,743
DATED : April 21, 1998
INVENTOR(S) : Alex WEISS

It is certified that error appears in the above-indentified patent and that said Letters Patent is hereby corrected as shown below:

> On title page, add -- [30] Foreign Application Priority Data Apr. 8, 1993 [IL] Israel 105343 --.

Signed and Sealed this

Eleventh Day of August 1998

*Attest:*

BRUCE LEHMAN

*Attesting Officer*     *Commissioner of Patents and Trademarks*